US012119663B2

(12) United States Patent
De Vos et al.

(10) Patent No.: US 12,119,663 B2
(45) Date of Patent: Oct. 15, 2024

(54) METHOD AND DEVICE FOR ENERGY HARVESTING AND CHARGING RECHARGEABLE ENERGY STORAGE DEVICES

(71) Applicant: E-PEAS S.A., Mont-Saint-Guibert (BE)

(72) Inventors: Julien De Vos, Mont-Saint-Guibert (BE); Geoffroy Gosset, Mont-Saint-Guibert (BE)

(73) Assignee: E-PEAS S.A., Mont-Saint-Guibert (BE)

( * ) Notice: Subject to any disclaimer, the term of this patent is extended or adjusted under 35 U.S.C. 154(b) by 485 days.

(21) Appl. No.: 17/611,963

(22) PCT Filed: May 19, 2020

(86) PCT No.: PCT/EP2020/063935
§ 371 (c)(1),
(2) Date: Nov. 17, 2021

(87) PCT Pub. No.: WO2020/239532
PCT Pub. Date: Dec. 3, 2020

(65) Prior Publication Data
US 2022/0239150 A1    Jul. 28, 2022

(30) Foreign Application Priority Data

May 29, 2019    (EP) .................................... 19177470

(51) Int. Cl.
*H02J 7/00*     (2006.01)
*H02J 7/34*     (2006.01)
(Continued)

(52) U.S. Cl.
CPC .......... *H02J 50/001* (2020.01); *H02J 7/0013* (2013.01); *H02J 7/0048* (2020.01); *H02J 7/0063* (2013.01);
(Continued)

(58) Field of Classification Search
USPC ......................................................... 320/162
See application file for complete search history.

(56) References Cited

U.S. PATENT DOCUMENTS

| 2016/0322859 A1 | 11/2016 | Yamamoto et al. |
| 2017/0070085 A1* | 3/2017 | Cher ......................... H02J 7/34 |
| 2019/0160961 A1* | 5/2019 | Shen ................... H02M 3/1588 |

FOREIGN PATENT DOCUMENTS

| EP | 3236559 A1 | 10/2017 |
| WO | 2016196640 A1 | 12/2016 |
| WO | 2018234496 A1 | 12/2018 |

OTHER PUBLICATIONS

Int'l. Search Report for PCT/EP2020/063935, dated Jul. 2, 2020.

* cited by examiner

*Primary Examiner* — Samuel Berhanu
(74) *Attorney, Agent, or Firm* — MaxGoLaw PLLC

(57) ABSTRACT

A method for energy harvesting and charging energy storage devices is provided. The method uses a voltage converter system and includes the steps of monitoring a parameter $V_{Batt1}$ indicative of a charging level of a first rechargeable storage device and of maintaining this parameter $V_{Batt1}$ between a lower and an upper threshold value. The method further includes steps of charging a second rechargeable storage device and operating the voltage converter system for transferring charges from the second to the first rechargeable storage device. An integrated circuit for energy harvesting is provided in which a terminal connectable with a second rechargeable storage device is switchably coupled to both the input and the output of the voltage converter system.

20 Claims, 11 Drawing Sheets

Figure 1A:
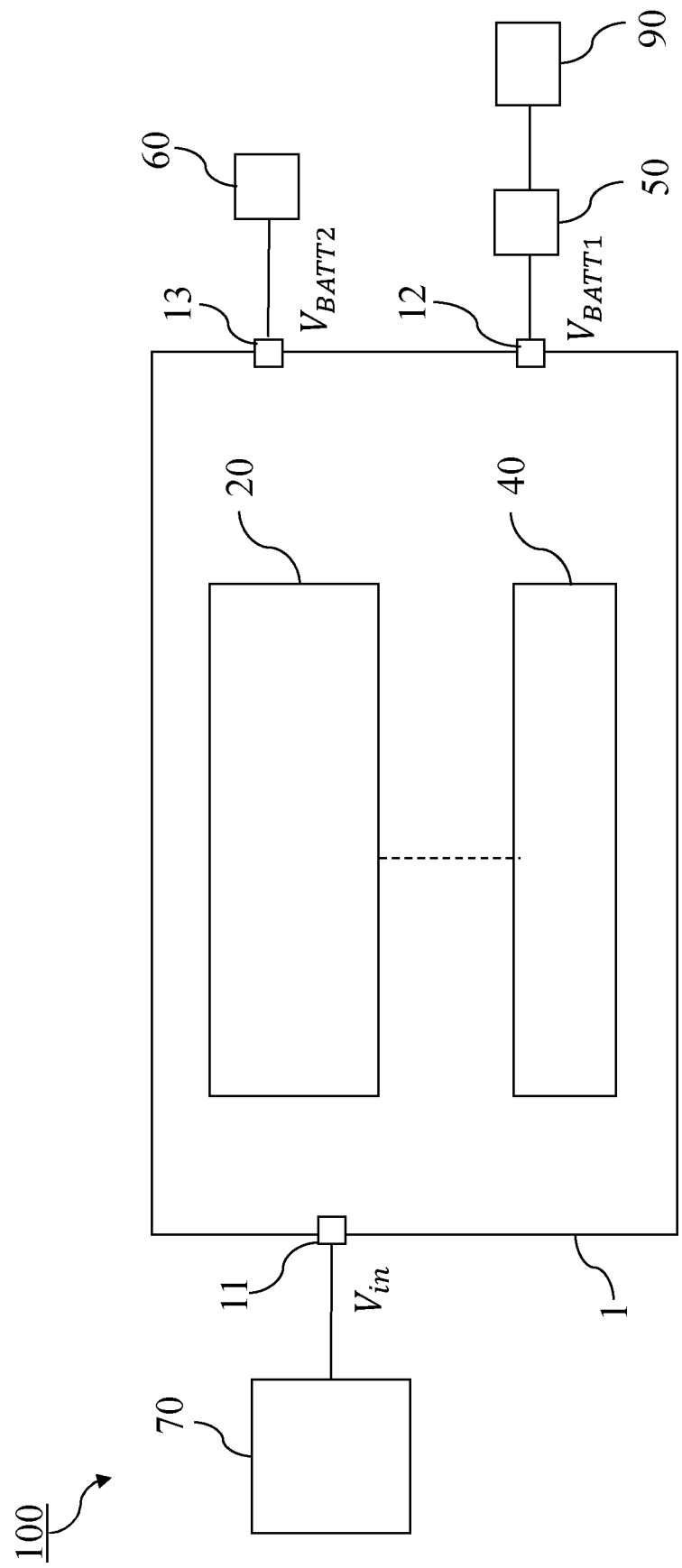

(51) Int. Cl.
  *H02J 50/00* (2016.01)
  *H02M 3/158* (2006.01)
(52) U.S. Cl.
  CPC ........ *H02J 7/007182* (2020.01); *H02J 7/342* (2020.01); *H02M 3/1582* (2013.01); *H02J 7/345* (2013.01); *H02J 2207/20* (2020.01)

METHOD AND DEVICE FOR ENERGY HARVESTING AND CHARGING RECHARGEABLE ENERGY STORAGE DEVICES

FIELD OF THE INVENTION

The invention relates to a method and device for energy harvesting. More specifically, it relates to a method and device for charging rechargeable energy storage devices.

DESCRIPTION OF PRIOR ART

The use of voltage converters for extracting energy from an energy harvester and charging an energy storage device are well known in the art. For example in WO2018234485, an integrated circuit comprising a voltage converter is described for transferring energy from an energy harvester to a rechargeable storage device. The energy stored in the rechargeable storage device is then used as a power source for an application load. The application load can be coupled directly or indirectly to the storage device. An indirect coupling is for example established by placing an auxiliary voltage converter between the storage device and the application load and wherein the auxiliary voltage converter is configured for regulating a specific required voltage for the application load.

A variety of energy harvesters can be used as energy sources such as for example photovoltaic cells (PV), thermoelectric generators (TEG), piezoelectric energy generators and electromagnetic energy generators. The rechargeable storage device is for example a rechargeable battery such as Li-ion battery, a supercapacitor or a conventional capacitor.

One of the problems with the known energy harvesting systems is that when initially starting with a depleted rechargeable storage device, it takes a long time to initially charge the rechargeable storage device with energy from the energy harvester. As a consequence, it also takes a long time before the application load can receive power from the rechargeable storage device and start operating. Especially if the rechargeable storage device is a supercapacitor, being at zero Volt when fully de-charged, the charging time of the supercapacitor can be very long. But also charging rechargeable batteries to a required charging level for being ready supplying power to an application load during a sufficiently long time period can take a considerable long charging time.

A second problem is related to the variable conditions inherent to energy harvesting systems which result in situations where the energy harvester is not supplying continuously energy over a longer period of time, e.g. over time periods of multiple days. Depending on the type of energy harvester, energy harvesting can be interrupted over considerable long time intervals, e.g. time intervals of several hours, which degrades the reliability and long term functionality of the application load. Depending on the power consumption of the application load, this can result in an application load being stopped from operating.

For the second problem, back-up systems have been proposed wherein for example a primary battery is connected to the application load during the time intervals the energy harvester is not supplying energy.

SUMMARY OF THE INVENTION

It is an object of the present invention to provide a method and device for energy harvesting and charging a rechargeable storage device in an efficient way such that an application load coupled with the rechargeable storage device for receiving power can start operating more quickly, i.e. within a few minutes, even in situations where the rechargeable storage device is initially fully depleted. A further object is that the application load can continue to operate even under conditions wherein the energy harvester is interrupted over a longer period of time, for example interruptions of several hours or even several days. The object is also to maximize the extraction and use of energy from the energy harvester.

The present invention is defined in the appended independent claims. The dependent claims define advantageous embodiments.

According to a first aspect of the invention, a method for energy harvesting and supplying electrical power to an application load is provided. The application load to be powered with the energy harvested can be any type of application such as for example portable devices, sensors, external circuits, or wireless transmitters.

The method for energy harvesting according to the invention uses a voltage converter system for converting input power into output power and for charging at least a first and a second rechargeable storage device. Typically, the voltage converter system comprises one or more voltage converters.

The method according to the invention comprises steps of coupling a first power input path between an energy harvester and the voltage converter system for transferring input power from the energy harvester to the voltage converter system, monitoring a parameter $V_{Batt1}$ and a parameter $V_{Batt2}$ indicative of a charging level of respectively the first rechargeable storage device and the second rechargeable storage device and coupling the first rechargeable storage device to an application load such that the first rechargeable storage device when charged can supply power to the application load.

In embodiments, the parameters $V_{Batt1}$ and $V_{Batt2}$ correspond to a voltage of respectively the first and the second rechargeable storage device. In other embodiments, the parameters $V_{Batt1}$ and $V_{Batt2}$ correspond to respectively a first and a second accumulated charge acquired by for example charge counters counting accumulated charges during the charging process of the first and second rechargeable storage devices.

The method further comprises a step of coordinating charging of the first and the second rechargeable storage device by repetitively performing sub-steps of:

1a) coupling a first power output path between the voltage converter system and the first rechargeable storage device for transferring output power from the voltage converter system to the first rechargeable storage device, 2a) operating the voltage converter system for charging the first rechargeable storage device with energy from the energy harvester until the parameter $V_{Batt1}$ has reached an upper threshold value $V_{Batt1\text{-}up}$, and wherein the charging of the first rechargeable storage device with energy from the harvester comprises transferring charges from the energy harvester to the first rechargeable storage device, 3a) if $V_{Batt1}$ has reached the upper threshold value $V_{Batt1\text{-}up}$ and if $V_{Batt2}$ is below an upper threshold value $V_{Batt2\text{-}max}$ then
  i) decoupling the first power output path and coupling a second power output path between the voltage converter system and the second rechargeable storage device for transferring output power from the voltage converter system to the second rechargeable storage device, and ii) operating the voltage converter system for charging the second rechargeable storage device with energy from the energy harvester, and wherein the charging of the second rechargeable storage device with energy from the harvester comprises transferring charges from the energy harvester to the second rechargeable storage device, 4a) if during the charging of the second rechargeable storage device the parameter $V_{Batt1}$ has subsequently decreased from the upper threshold value $V_{Batt1-up}$ down to a lower threshold value $V_{Batt1-low}$, with $V_{Batt1-low} < V_{Batt1-up}$, then decoupling the second power output path and restart at step 1a).

The method according to the invention further comprises a step of transferring energy from the second rechargeable storage device to the first rechargeable storage device if i) the parameter $V_{Batt1}$ of the first rechargeable storage device has dropped below a critical threshold value $V_{Batt1-SW}$, with $V_{Batt1-SW} < V_{Batt1-low}$, and if ii) the parameter $V_{Batt2}$ is equal or above a predefined threshold value $V_{Batt2-low}$. The step of transferring energy comprises sub-steps of: 1b) decoupling the first power input path, 2b) coupling a second power input path between the second rechargeable storage device and the voltage converter system for transferring input power from the second rechargeable storage device to the voltage converter system, and 3b) operating the voltage converter system for charging the first rechargeable storage device with energy from the second rechargeable storage device until the parameter $V_{Batt1}$ of the first rechargeable storage device has reached the upper threshold value $V_{Batt1-up}$.

Advantageously, by charging a second rechargeable storage device during a de-charging phase of the first rechargeable storage device, i.e. during the decrease of $V_{Batt1}$ from the upper threshold value $V_{Batt1-up}$ down to the lower threshold value $V_{Batt1-low}$, the application load can continue to operate during both the entire charging process of the second rechargeable storage device and during the entire process of repetitively re-charging the first rechargeable storage device. In this way, the use of the application load is not disturbing or interrupting the energy harvesting and the storage of energy in the second rechargeable storage device.

Advantageously, the second rechargeable storage device can be used to recharge the first storage device when the energy harvester is not operating.

Advantageously, when the energy harvester is not operating, by coupling a second power input path between the second rechargeable storage device and the voltage converter system, the voltage converter system is being used for transferring charges from the second to the first rechargeable storage device. Hence, the second rechargeable storage device can be a dedicated storage device operating at for example a different maximum voltage than the first rechargeable storage device and having a large energy storage capacity. The two storage devices can also be made of a different technology, the first rechargeable storage device can for example be a rechargeable battery such as a lithium ion battery, and the second rechargeable storage device can for example be a supercapacitor. In this way, if the energy harvester is interrupted over a long time period, the energy stored in the second rechargeable storage device can be transferred to the first rechargeable storage device and be used to continue power the application load.

Preferably, the second rechargeable storage device has an energy storage capacity that is more than five times, more preferably more than ten times, larger than the energy storage capacity of the first rechargeable storage device.

According to a second aspect of the invention an integrated circuit for energy harvesting is provided. The integrated circuit for energy harvesting comprising a voltage converter system that is suitable for converting input power into output power for charging at least two rechargeable storage devices, a first terminal connectable with an energy harvester, a second terminal connectable with a first rechargeable storage device, a third terminal connectable with a second rechargeable storage device, a controller for controlling the voltage converter system, a plurality of power input paths comprising at least a first power input path for transferring input power from the first terminal to the voltage converter system, a plurality of power output paths comprising at least a first power output path for transferring output power from the voltage converter system to the second terminal and a second power output path for transferring output power from the voltage converter system to the third terminal, a monitoring unit coupled with the controller and configured for monitoring a parameter $V_{Batt1}$ and a parameter $V_{Batt2}$ indicative of a charging level of respectively the first rechargeable storage device and the second rechargeable storage device when connected to respectively the second and third terminal.

In embodiments, the parameter $V_{Batt1}$ and the parameter $V_{Batt2}$ correspond for example to a voltage sensed at respectively the second and third terminal.

The integrated circuit for energy harvesting according to the invention is characterized in that the plurality of power input paths comprises a second power input path for transferring input power from the third terminal to the voltage converter system, and in that the voltage converter system comprises an input selection circuit for selecting a power input path from the plurality of power input paths so as to receive an input power via the power input path selected and an output selection circuit for selecting a power output path from the plurality of power output paths so as to output an output power via the power output path selected, and in that the controller is configured to form and to switch between a number of specific combinations of a power input and a power output path based on a comparison of the parameter $V_{Batt1}$ with first predefined threshold values and/or a comparison of the parameter $V_{Batt2}$ with second predefined threshold values. The specific combinations the controller can form and switch comprise: i) a first combination formed by selecting the first power input path and selecting the first power output path, ii) a second combination formed by selecting the first power input path and selecting the second power output path, iii) a third combination formed by selecting the second power input path and selecting the first power output path.

Selecting "a" power input path from the plurality of power input paths so as to receive an input power via the power input path selected has to be construed as selecting "one" power input path from the plurality of power input paths so as to only receive the input power via the power input path selected. Similarly, selecting "a" power output path from the plurality of power output paths so as to output an output power via the power output path selected has to be construed as selecting "one" power output path from the plurality of power output paths so as to output the output power only via the power output path selected.

Advantageously, by providing a second power input path for transferring input power from the third terminal to the voltage converter system, a second rechargeable storage device coupled to this third terminal can not only be charged with energy from the energy harvester for forming an energy reservoir, but can also be used as an alternative energy source for charging the first rechargeable storage device when the energy harvester is not operating. Indeed, as the third terminal is also coupled to the voltage converter system for suppling input power, the voltage converter system can be used to transfer charges from the second rechargeable storage device, being coupled to the third terminal, to the first rechargeable storage device, being coupled to the second terminal. In this way, even if the energy harvester is not operating, the first storage device can be continued to be charged such that the application load coupled to the first storage device can continue to operate.

In embodiments, the controller of the integrated circuit is further configured for: switching from the first combination to the second combination if the parameter $V_{Batt1}$ becomes equal or larger than an upper threshold value $V_{Batt1\text{-}up}$ and if the parameter $V_{Batt2}$ is lower than an upper threshold value $V_{Batt2}$-max, switching from the second combination to the first combination if the parameter $V_{Batt1}$ has decreased from the upper threshold value $V_{Batt1\text{-}up}$ down to a lower threshold value $V_{Batt1\text{-}low}$, with $V_{Batt1\text{-}low} < V_{Batt1\text{-}up}$, and switching from the first combination to the third combination if the parameter $V_{Batt1}$ has decreased from the lower threshold value $V_{Batt1\text{-}low}$ down to a critical threshold value $V_{Batt1\text{-}SW}$, with $V_{Batt1\text{-}SW} < V_{Batt1\text{-}low}$, and if $V_{Batt2}$ is above a lower threshold value $V_{Batt2\text{-}low}$, with $V_{Batt2\text{-}low} < V_{Batt2\text{-}max}$.

In embodiments, the integrated circuit comprises a fourth terminal connectable with an auxiliary energy source such as a primary battery, and the plurality of power input paths comprises a third input path for transferring input power from the fourth terminal to the voltage converter system, and wherein the specific combinations of input/output paths comprise a fourth combination formed by selecting the third power input path and selecting the first power output path.

In further embodiments, the voltage converter system comprises a voltage converter for converting input power received via the selected power input path into output power outputted via the selected power output path, and wherein the voltage converter is one of the following: a boost voltage converter, a buck voltage converter or a buck-boost voltage converter. In other words, in these embodiments a single voltage converter is used in combination with the input and output selection circuits.

SHORT DESCRIPTION OF THE DRAWINGS

Figure 1B:
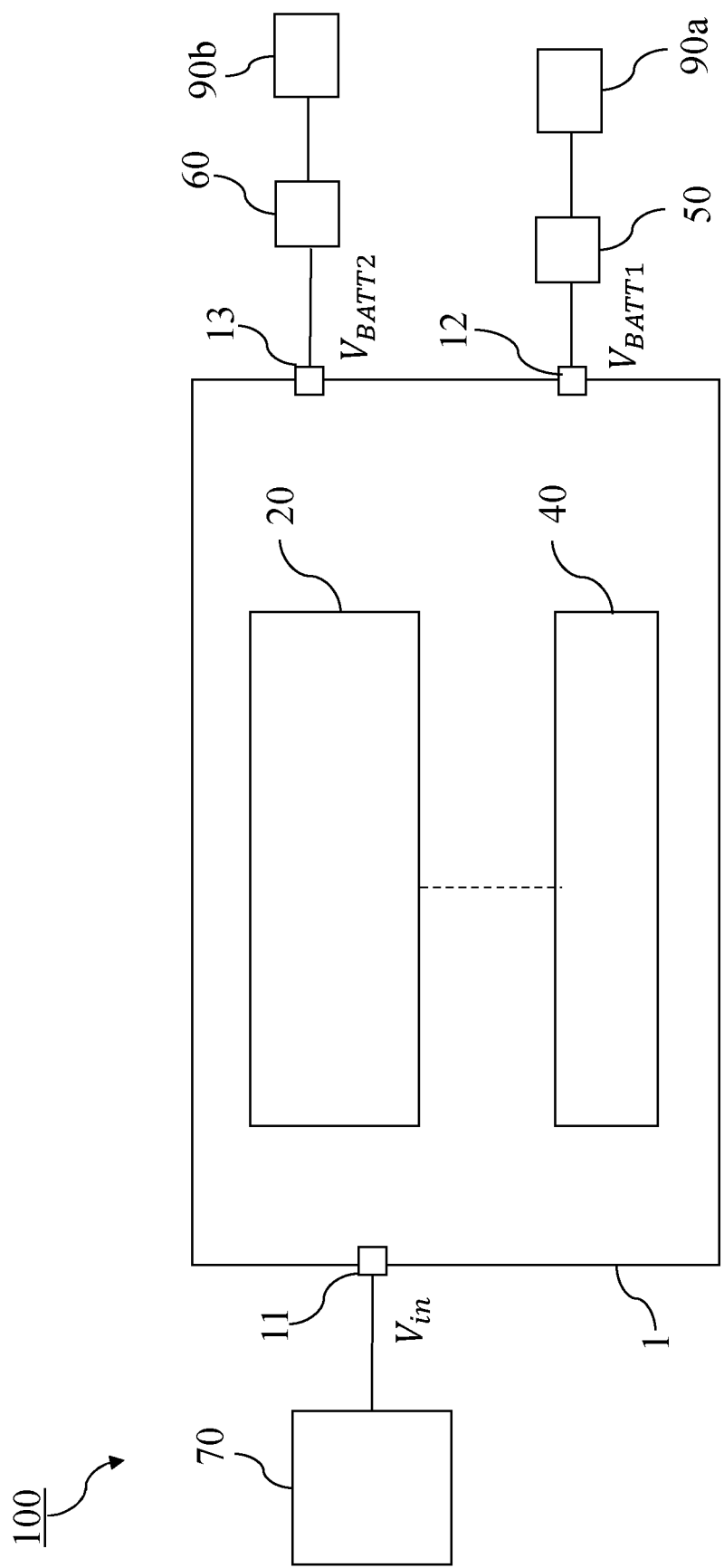
Figure 2:
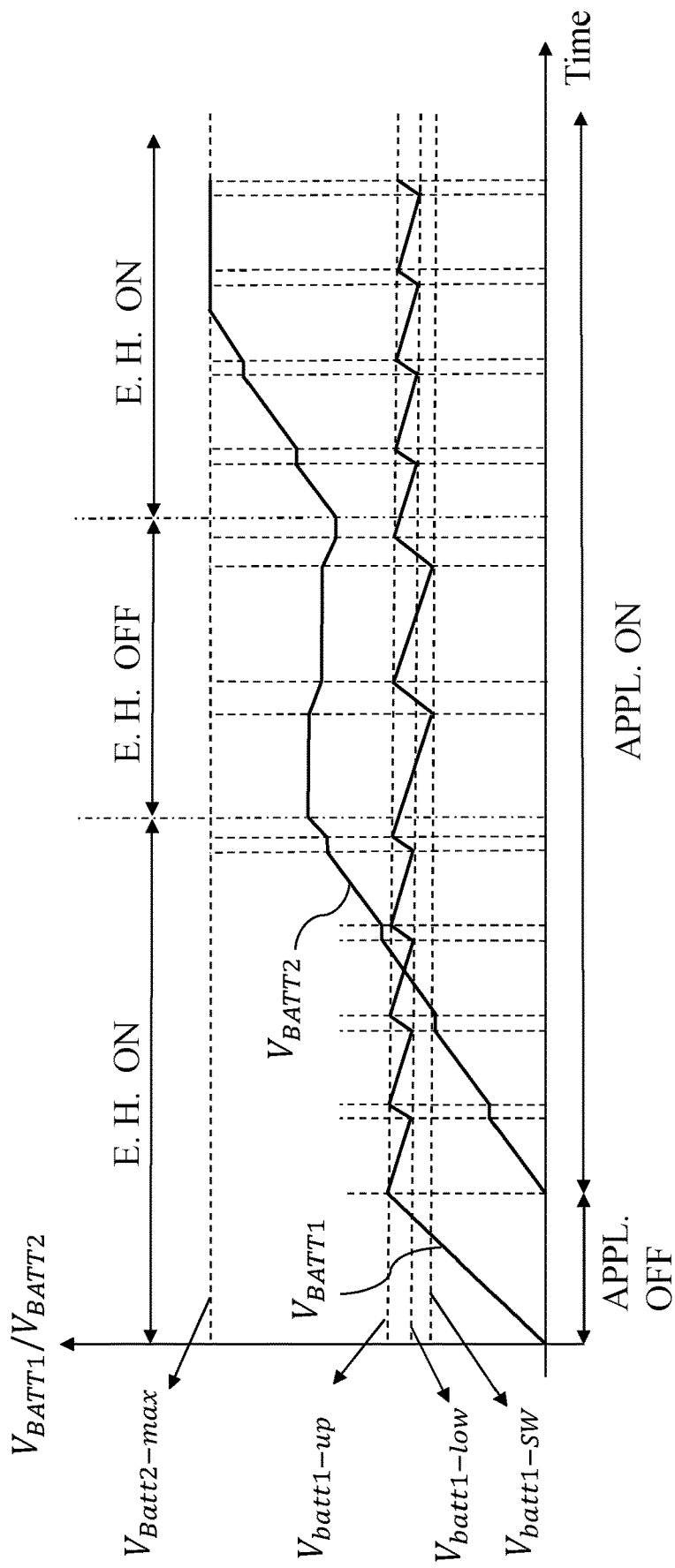
Figure 3:
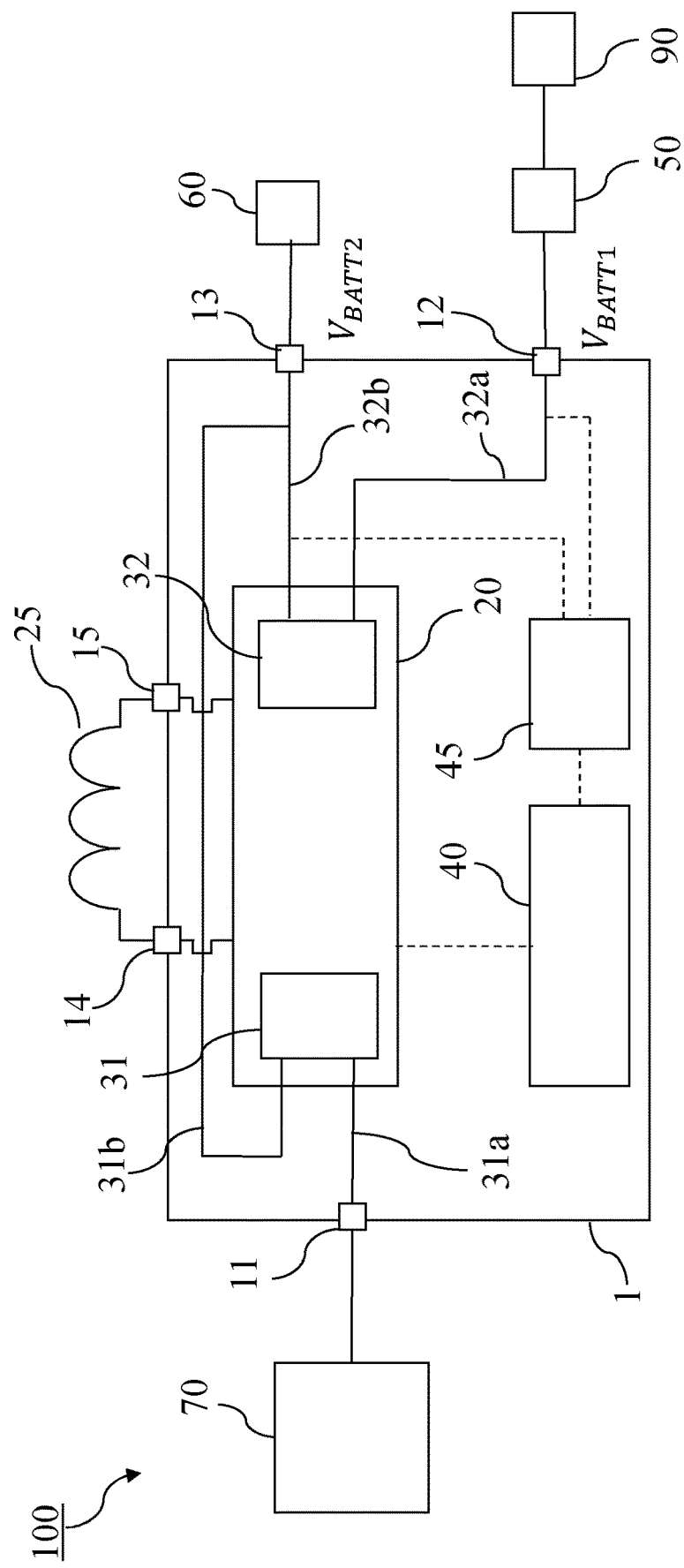
Figure 4A:
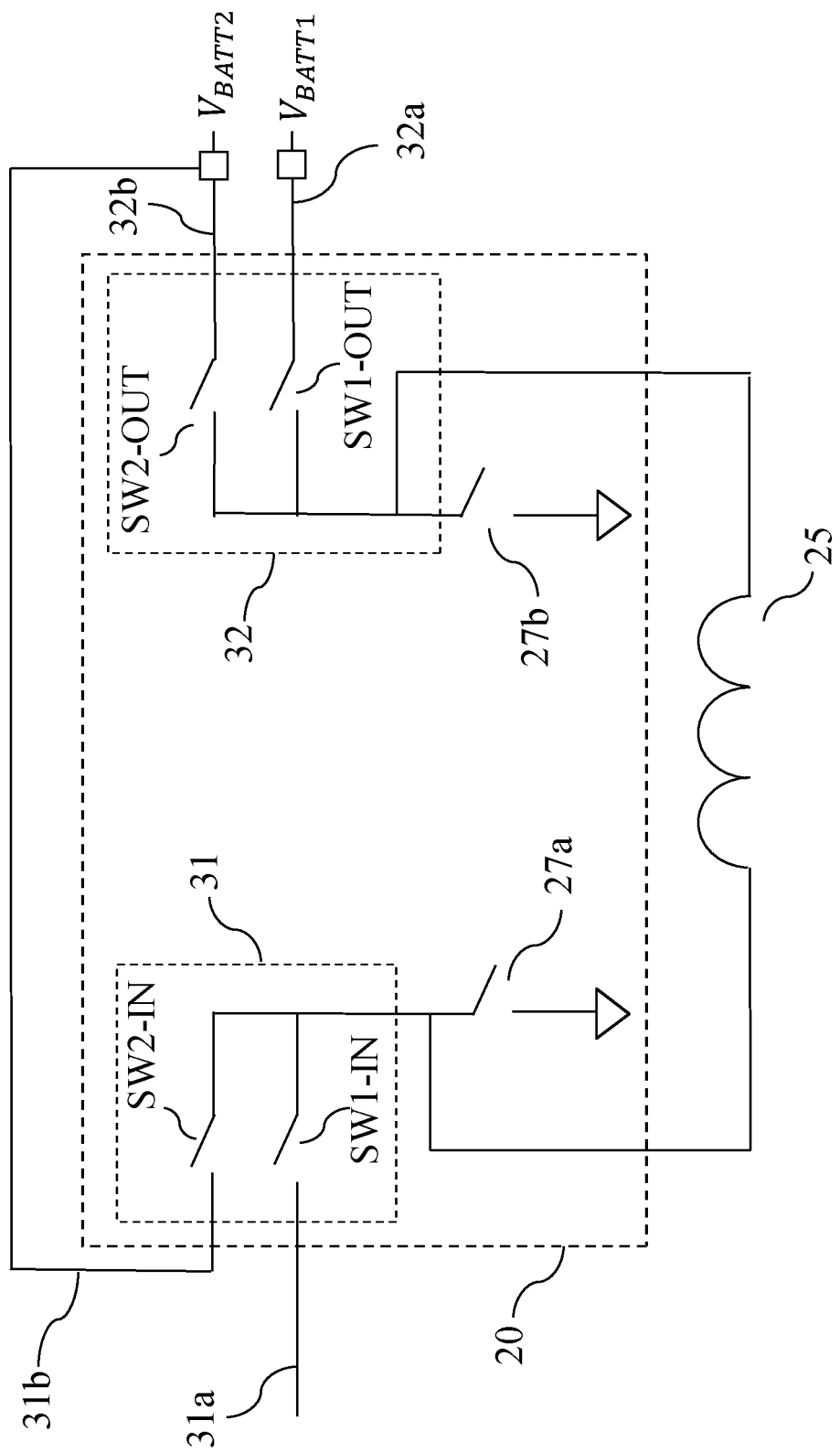
Figure 4B:
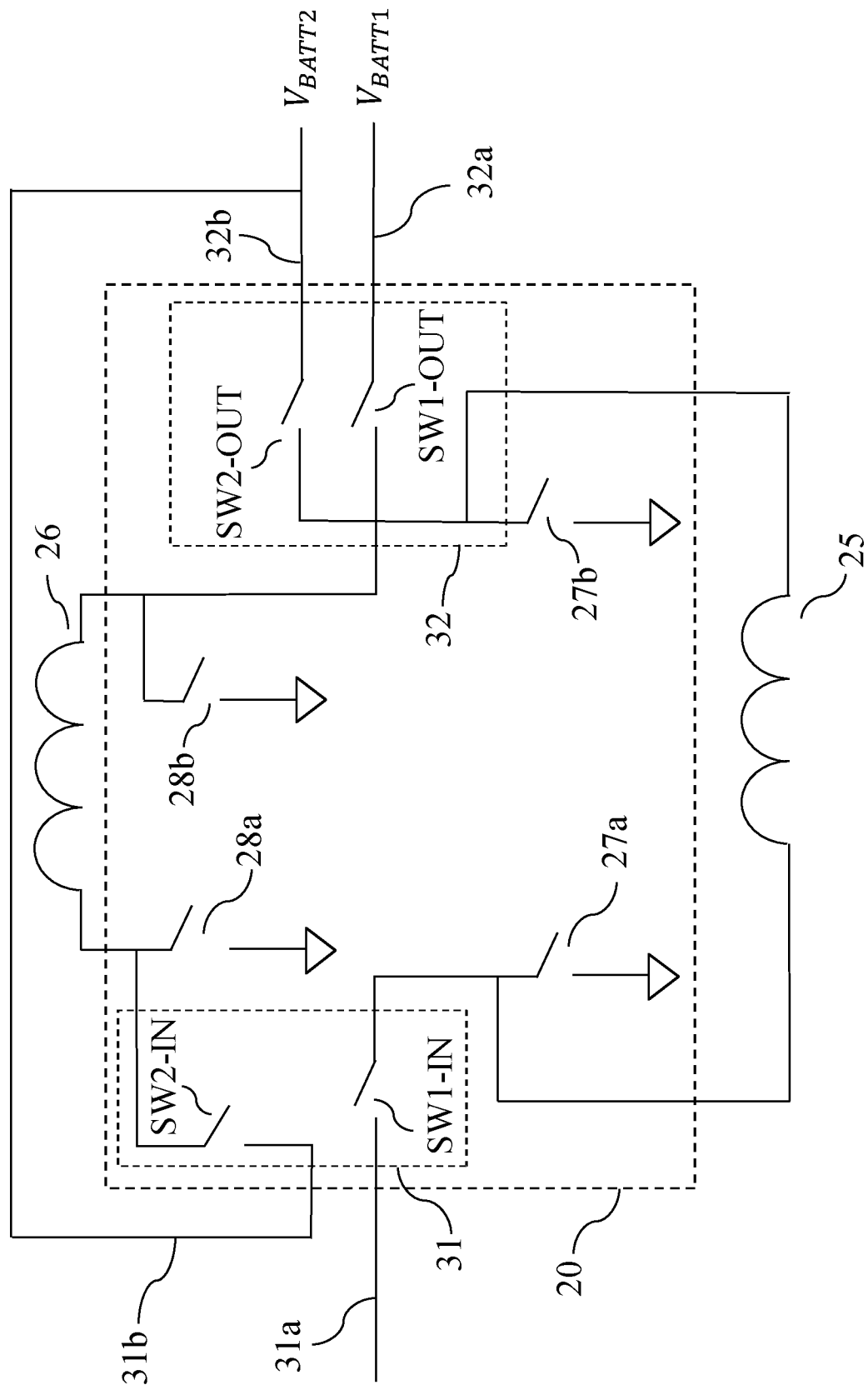
Figure 5:
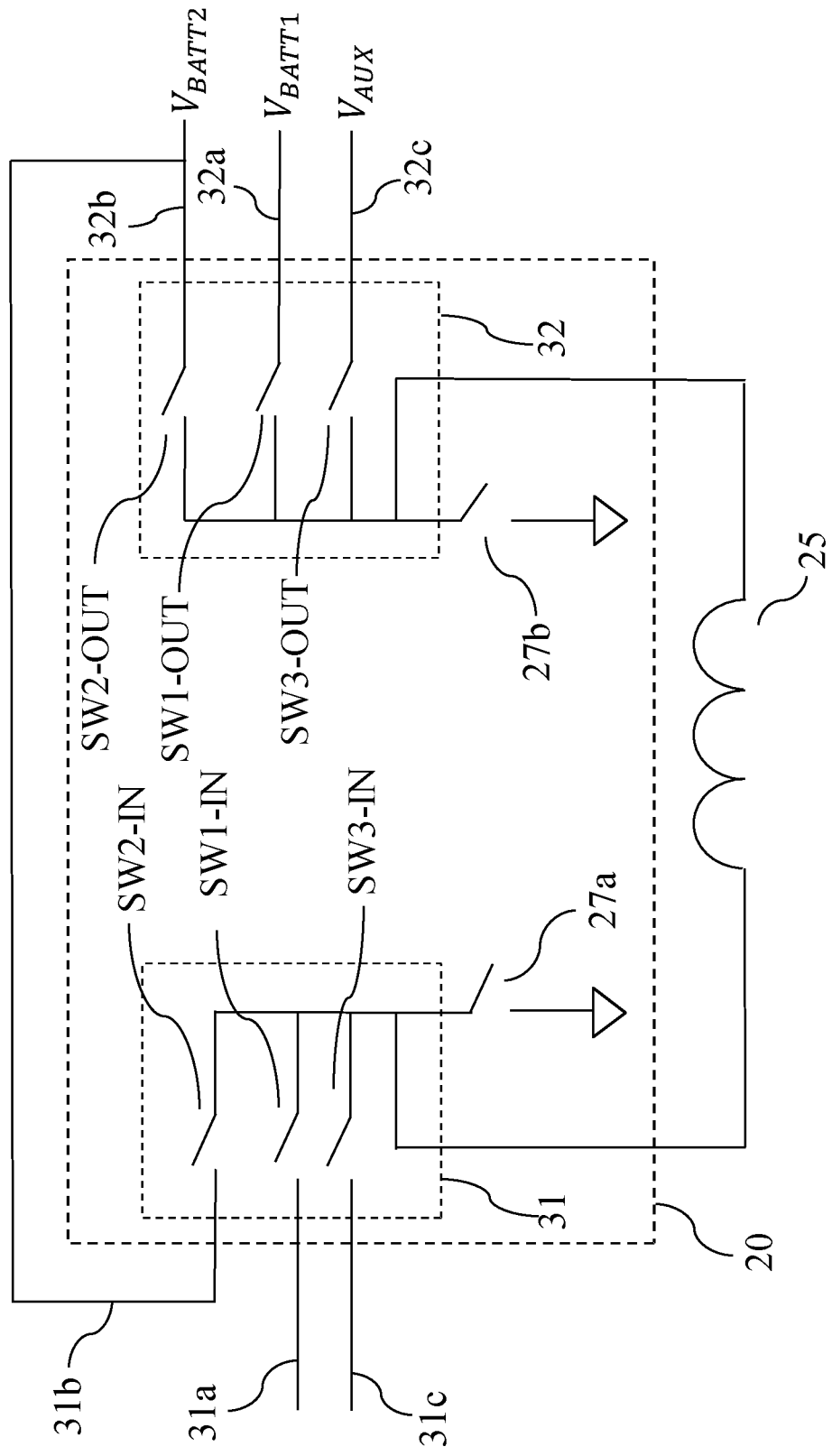
Figure 6A:
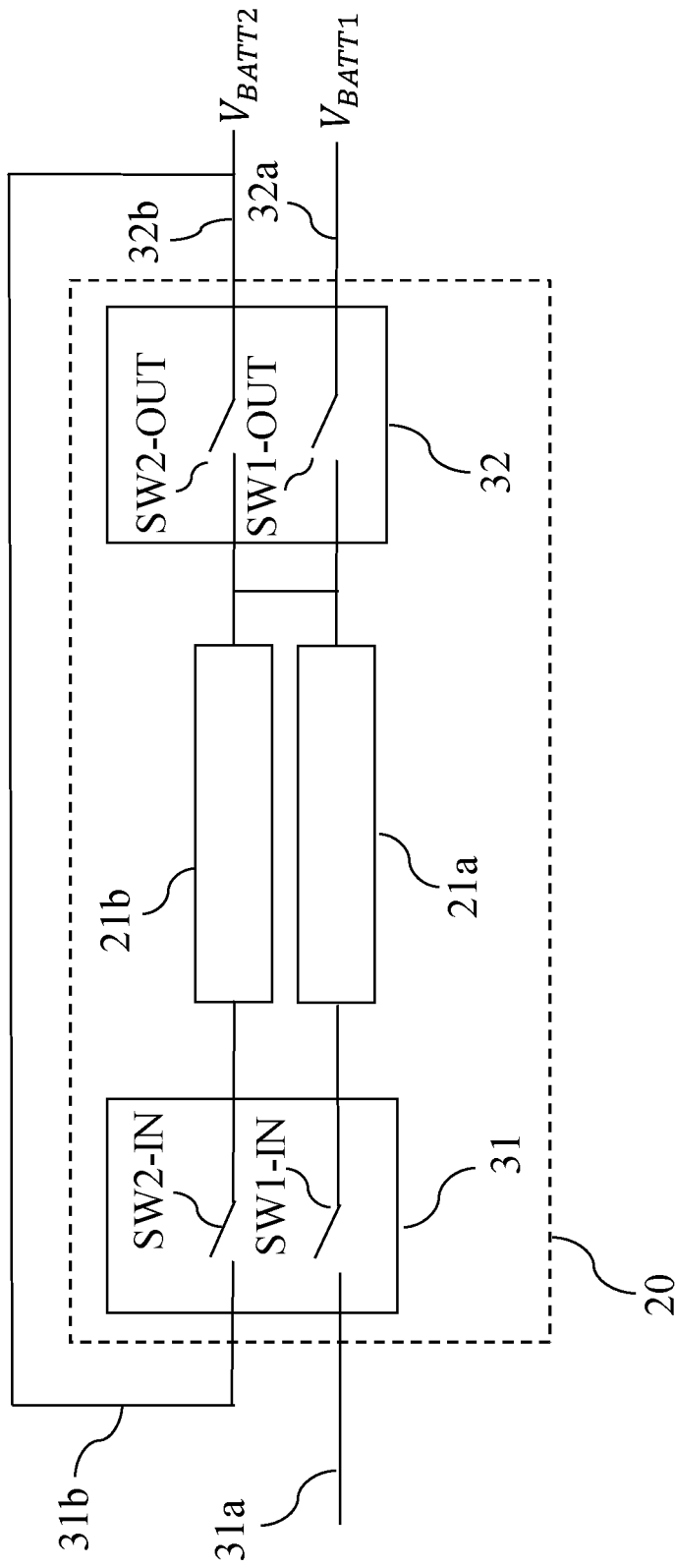
Figure 6B:
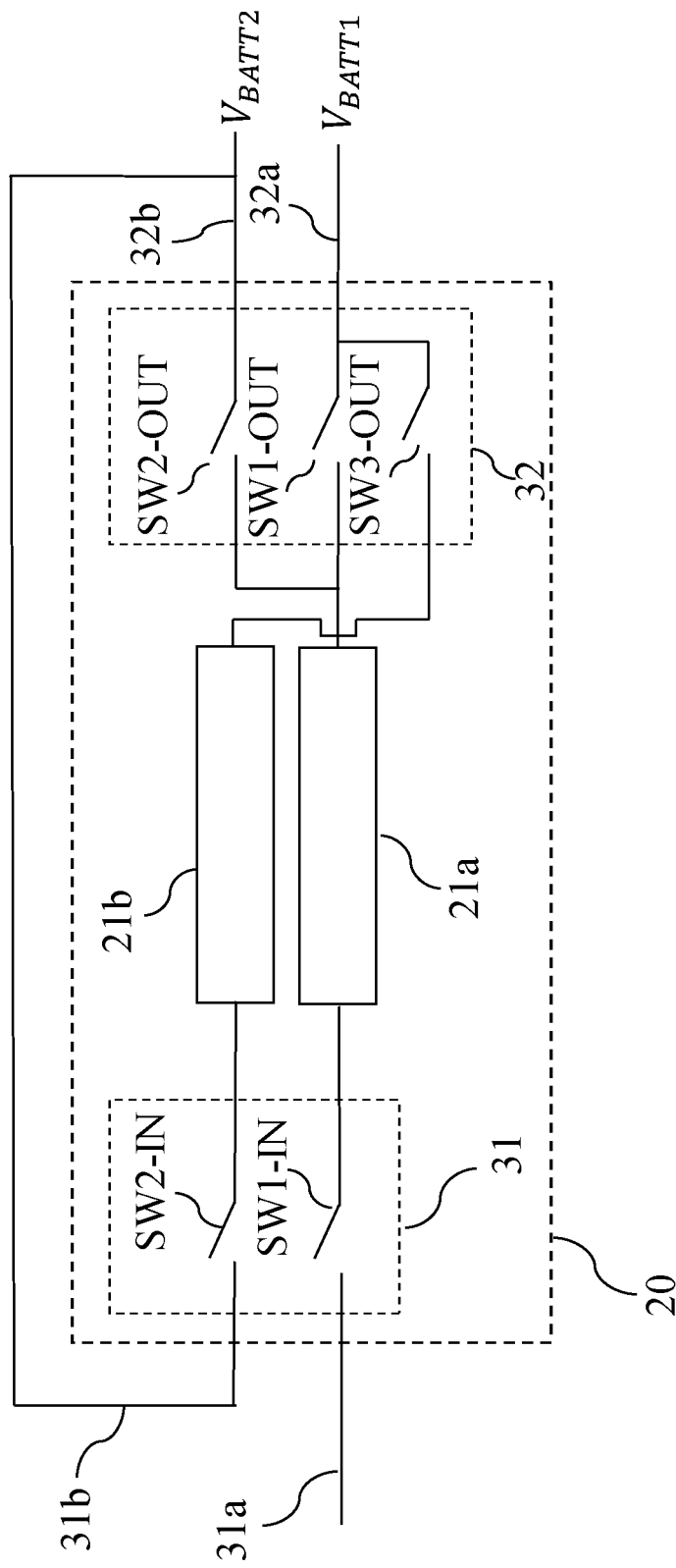
Figure 7:
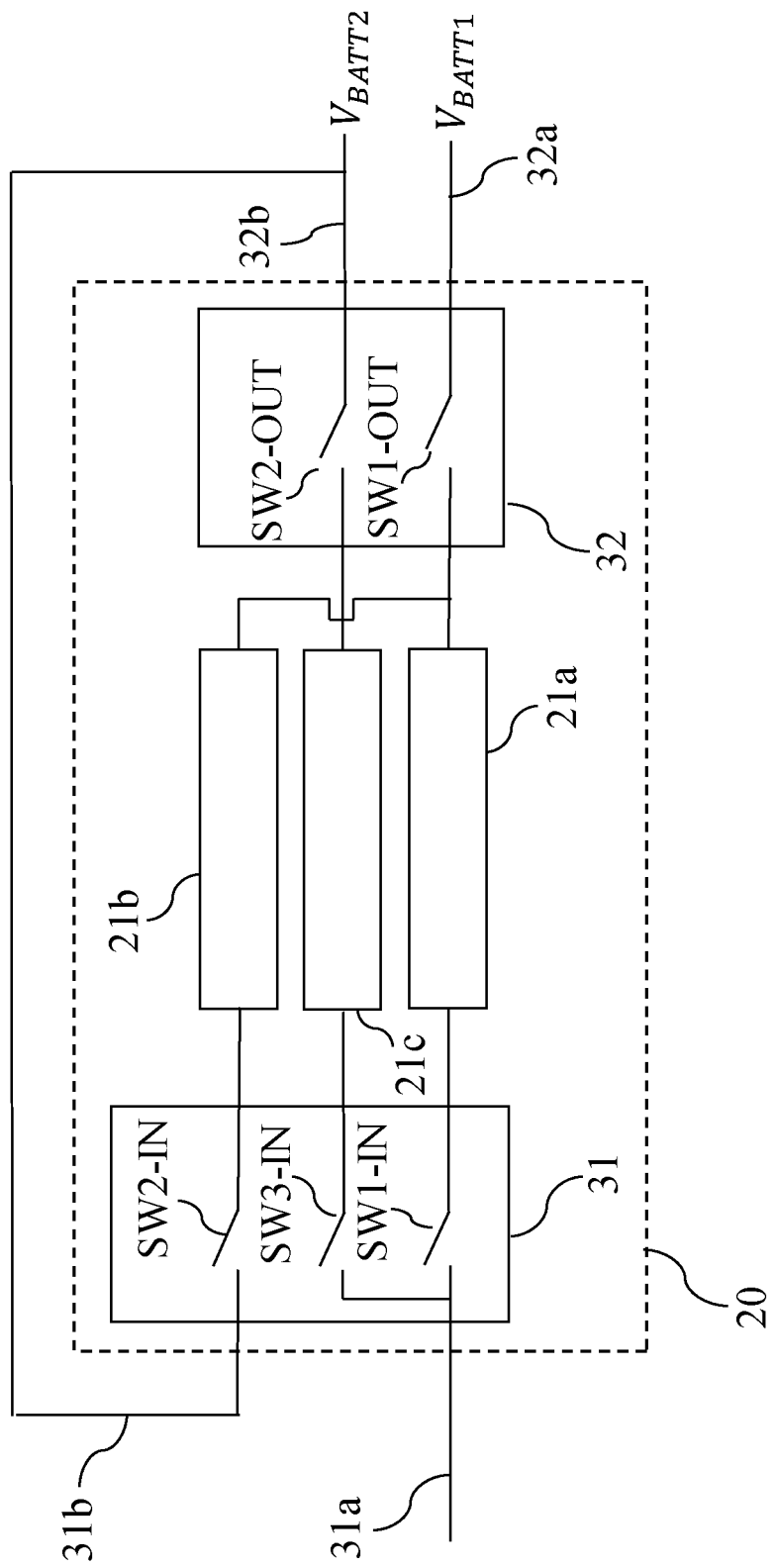
Figure 8:
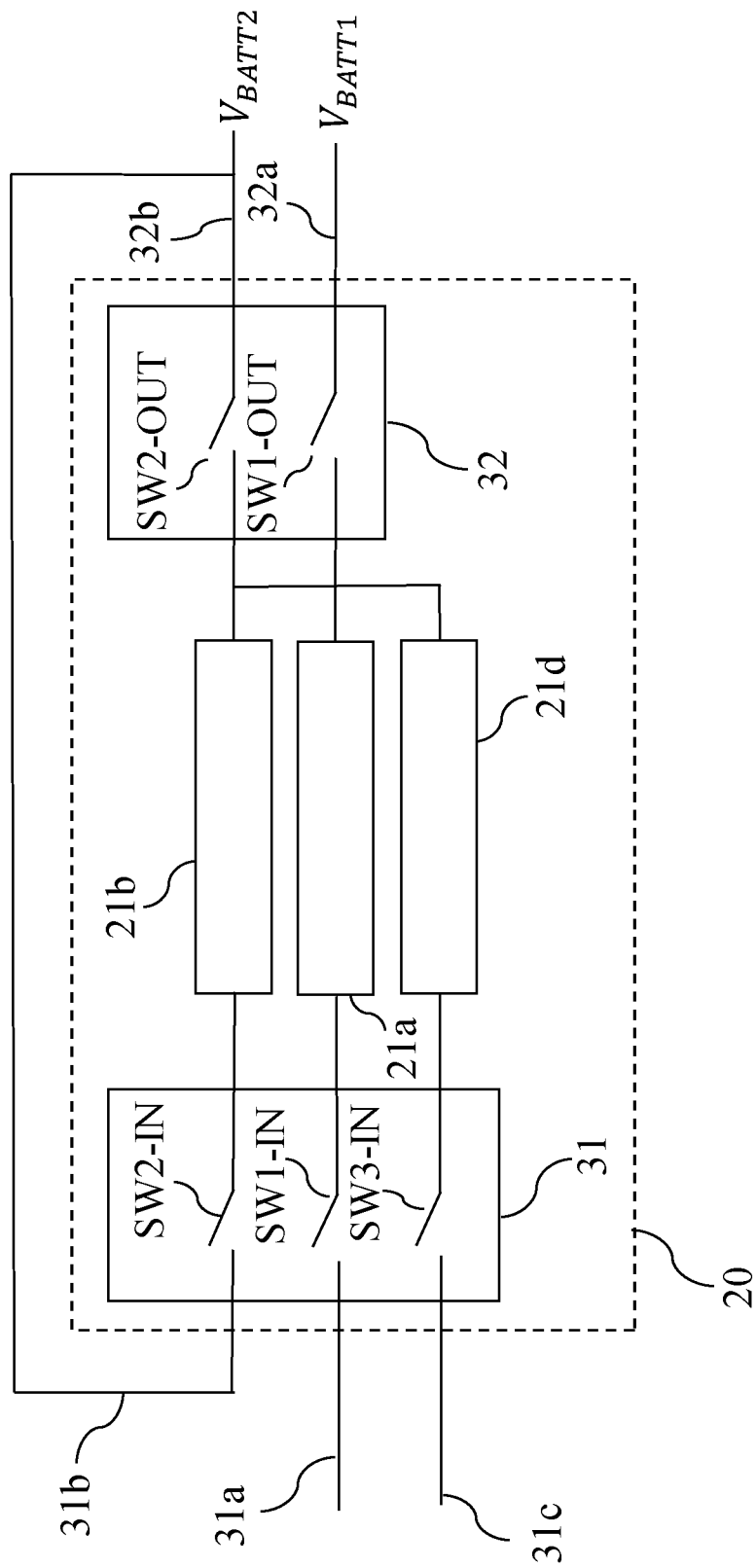

These and further aspects of the invention will be explained in greater detail by way of example and with reference to the accompanying drawings in which:

FIG. 1a schematically represents an example of an energy harvesting system according to the present disclosure, FIG. 1b schematically represents a further example of an energy harvesting system according to the present disclosure, FIG. 2 illustrates a charging process of a first and a second rechargeable storage device using the method according to the present invention, FIG. 3 schematically shows an energy harvesting system comprising an integrated circuit according to the present invention, FIG. 4a shows an example of a voltage converter system according to the invention comprising a buck/boost voltage converter, FIG. 4b shows an example of a voltage converter system according to the invention comprising two buck/boost voltage converters, FIG. 5 shows an example of a voltage converter system according to the invention comprising an input selection circuit for selecting between three power input paths and an output selection circuit for selecting between three power output paths, FIG. 6a shows an embodiment of a voltage converter system comprising two voltage converters, FIG. 6b shows an alternative embodiment of a voltage converter system comprising two voltage converters, FIG. 7 shows an embodiment of voltage converter system comprising three voltage converters, FIG. 8 shows an embodiment of voltage converter system comprising three voltage converters and comprising an input selection circuit for selecting between three power input paths and an output selection circuit for selecting between two power output paths.

The drawings of the figures are neither drawn to scale nor proportioned. Generally, identical components are denoted by the same reference numerals in the figures.

DETAILED DESCRIPTION OF EMBODIMENTS OF THE INVENTION

The present disclosure will be described in terms of specific embodiments, which are illustrative of the disclosure and not to be construed as limiting. It will be appreciated by persons skilled in the art that the present disclosure is not limited by what has been particularly shown and/or described and that alternatives or modified embodiments could be developed in the light of the overall teaching of this disclosure. The drawings described are only schematic and are non-limiting.

Use of the verb "to comprise", as well as the respective conjugations, does not exclude the presence of elements other than those stated.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

Reference throughout this specification to "one embodiment" or "an embodiment" means that a particular feature, structure or characteristic described in connection with the embodiments is included in one or more embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one ordinary skill in the art from this disclosure, in one or more embodiments.

According to a first aspect of the invention, a method for energy harvesting and supplying electrical power to an application load is provided. The method for energy harvesting makes use of a system for energy harvesting comprising a voltage converter system.

A voltage converter system has to be construed as a system for converting input power received from an energy source into output power for charging a storage device. The energy source, for example an energy harvester, is supplying input power at an input voltage $V_{in}$ and the voltage converter system is outputting output power at an output voltage $V_{out}$ corresponding to the voltage of the storage device. The input voltage $V_{in}$ can be higher or lower than the output voltage $V_{out}$. Typically, the voltage converter system comprises one or more voltage converters and detailed embodiments of various voltage converter systems will be further described below. An example of a voltage converter is a DC-DC boost converter, a DC-DC buck converter or a DC-DC buck/boost converter. Generally, the voltage converter system is part of an integrated circuit, generally named power management integrated circuit (PMIC).

In FIG. 1a, an example of a system 100 for energy harvesting is schematically shown. The system comprises a power management integrated circuit (PMIC) 1 comprising a voltage converter system 20 and a controller 40 for controlling the voltage converter system. An energy harvester 70 is coupled to a first terminal 11, which is an input terminal for receiving power from the energy harvester at an input voltage $V_{in}$. The PMIC 1 comprises a second terminal 12, being an output terminal that is coupled to a first rechargeable storage device 50. In this example, the application load 90 is coupled to the first storage device 50 by a direct connection. In other embodiments, a voltage regulator can for example be placed between the first storage device and the application load to generate a required voltage for the application load that is different from the voltage of the first storage device. The PMIC shown on FIG. 1a comprises a third terminal 13 being connected with a second rechargeable storage device 60.

The first rechargeable storage device is for example a rechargeable battery, a capacitor or supercapacitor and similarly, the second rechargeable storage device can also be either a rechargeable battery, a capacitor or supercapacitor.

In FIG. 1b, a further example of a system for energy harvesting is schematically shown wherein a first application load 90a is coupled to a first storage device 50 and wherein a second application load 90b is coupled to a second storage device 60. The first application load is for example a low-power load, for instance for monitoring purposes, and the second application load is for example a higher power load, for instance for communication means or actuation means.

The method for energy harvesting according to the present invention comprises steps of coupling a first power input path between an energy harvester and the voltage converter system for transferring input power from the energy harvester to the voltage converter system 20, monitoring a parameter $V_{Batt1}$ and a parameter $V_{Batt2}$ indicative of a charging level of respectively the first rechargeable storage device 50 and the second rechargeable storage device 60 and coupling the first rechargeable storage device to an application load 90 such that the first rechargeable storage device when charged can supply power to the application load.

In embodiments, the parameters $V_{Batt1}$ and $V_{Batt2}$ correspond to a voltage of respectively the first and the second rechargeable storage device obtained by a voltage measurement. In other embodiments, the parameters $V_{Batt1}$ and $V_{Batt2}$ correspond to an amount of charges acquired with a charge counter.

When the first storage device is sufficiently charged, as indicated by an upper threshold voltage $V_{Batt1-up}$ being reached, the first rechargeable storage device 50 can be used as a power supply for the application load 90. The voltage threshold $V_{Batt1-up}$ does not necessarily correspond to a fully charged storage device but it can be a value indicating that the first storage device is sufficiently charged to start supplying power to the application load.

The method according to the invention further comprises a step of coordinating charging of the first and the second rechargeable storage device by repetitively performing sub-steps 1a) to 4a) outlined here below.

Sub-step 1a) corresponds to coupling a first power output path between the voltage converter system and the first rechargeable storage device for transferring output power from the voltage converter system to the first rechargeable storage device.

Sub-step 2a) corresponds to operating the voltage converter system for charging the first rechargeable storage device with energy from the energy harvester until the parameter $V_{Batt1}$ has reached an upper threshold value $V_{Batt1-up}$. Hence, during the charging of the first rechargeable storage device, charges are being transferred from the energy harvester to the first rechargeable storage device.

Sub-step 3a) is performed if the conditions are fulfilled that $V_{Batt1}$ has reached the upper threshold value $V_{Batt1-up}$ and that $V_{Batt2}$ is below an upper threshold value $V_{Batt2}$-max. Sub-step 3a) corresponds to: i) decoupling the first power output path and coupling a second power output path between the voltage converter system 20 and the second rechargeable storage device 60 for transferring output power from the voltage converter system to the second rechargeable storage device, and ii) operating the voltage converter system for charging the second rechargeable storage device with energy from the energy harvester. Hence, during the charging of the second rechargeable storage device, charges are being transferred from the energy harvester to the second rechargeable storage device.

Sub-step 4a) corresponds to decoupling the second power output path and restart at step 1a) if during the charging of the second rechargeable storage device the parameter $V_{Batt1}$ has subsequently decreased from the upper threshold value $V_{Batt1-up}$ down to a lower threshold value $V_{Batt1-low}$, with $V_{Batt1-low} < V_{Batt1-up}$.

Hence, by repetitively performing sub-steps 1a) to 4a) the second rechargeable storage device 60 is being charged while maintaining the first rechargeable storage device 50 charged between charging levels $V_{Batt1-low}$ and $V_{Batt1-up}$.

In FIG. 2, a process for charging the first and second rechargeable storage device according to the method of the present disclosure is illustrated. The variation of the parameters $V_{Batt1}$ and $V_{Batt2}$ are shown as function of time, illustrating the charging and de-charging of respectively the first and second rechargeable storage device. As illustrated on FIG. 2, by performing the above mentioned sub-steps 1a) to 4a), the first storage device 50 remains charged by keeping the parameter $V_{Batt1}$ of the first storage device 50 between the lower threshold value $V_{Batt1-low}$ and the upper threshold value $V_{Batt1-up}$, and in parallel the second storage device 60 is being charged with energy from the energy harvester while the first storage device 50 is supplying power to the application load.

The application load continues to be operated while the second storage device 60 is being charged such that there is no interruption in the operation of the application load. This is schematically illustrated with the example shown on FIG. 2 where the time period wherein the application load is on and off is respectively indicated by "APPL. ON" and "APPL. OFF". When the application load in on and when the second rechargeable storage device is being charged, then the first storage device is de-charging as indicated by the parameter $V_{Batt1}$ of the first storage device decreasing from the upper threshold value $V_{Batt1-up}$ down to the lower threshold value $V_{Batt1-low}$. The lower threshold value $V_{Batt1-low}$ is typically a value selected such that the first storage device is still sufficiently charged to provide electrical power to the application load. The values selected for the lower and upper threshold values for the first storage device depend on the type of storage device used, e.g. a rechargeable battery or a capacitor a or supercapacitor. The upper threshold $V_{Batt1-up}$ is not necessarily equal to the maximum allowable voltage value $V_{Batt1-max}$ of the first rechargeable storage device, $V_{Batt1-up}$ can for example be a value that is smaller than $V_{Batt1-max}$.

The method according to the present disclosure is characterized in that the method comprises a further step of transferring energy from the second rechargeable storage device to the first rechargeable storage device if i) the parameter $V_{Batt1}$ of the first rechargeable storage device has dropped below a critical threshold value $V_{Batt1-SW}$, with $V_{Batt1-SW}<V_{Batt1-low}$, and if ii) the parameter $V_{Batt2}$ is equal or above a predefined threshold value $V_{Batt2-low}$. The predefined threshold value $V_{Batt2-low}$ is a value indicating that the second rechargeable storage device is charged to a minimum charging level allowing to transfer charges from the second to the first rechargeable storage device.

The step of transferring energy from the second to the first rechargeable storage device comprises sub-steps of: 1b) decoupling the first power input path, 2b) coupling a second power input path between the second rechargeable storage device and the voltage converter system for transferring input power from the second rechargeable storage device to the voltage converter system, and 3b) operating the voltage converter system for charging the first rechargeable storage device with energy from the second rechargeable storage device until the parameter $V_{Batt1}$ of the first rechargeable storage device has reached the upper threshold value $V_{Batt1-up}$.

In embodiments, the transferring of energy from the second rechargeable storage device 60 to the first rechargeable storage device 50 comprises a further sub-step 4b) in case the parameter $V_{Batt1}$ has reached the upper threshold value $V_{Batt1-up}$. Sub-step 4b) corresponds to performing at least one or a combination of the following steps: i) decoupling the first power output path 32a and/or decoupling the second power input path 31b, ii) coupling the first power input path 31a and coupling the second power output path 32b, iii) stop operating the voltage converter system 20.

In case in sub-step 4b), the step ii) of coupling the first power input path 31a and coupling the second power output path 32b is applied, then if the energy harvester is supplying power, the second rechargeable storage device will continue to be charged with energy from the energy harvester.

The transferring of energy from the second to the first storage device when the parameter $V_{Batt1}$ of the first storage device 50 has dropped below the critical threshold level $V_{Batt1-SW}$ is also illustrated on FIG. 2. Such a drop of the parameter $V_{Batt1}$ typically happens when the energy harvester is off or when the application load is consuming more power than the power the energy harvester is supplying. For example, as illustrated on FIG. 2, when the energy harvester is switching from an on state indicated by "E.H. ON" to an off state indicated by "E.H. OFF", nor the first nor the second storage device can be charged with energy from the energy harvester. As a consequence, as the application load is on and hence consuming power, the voltage of $V_{Batt1}$ when decreasing to $V_{Batt1-low}$ will continue to further decrease until $V_{Batt1-SW}$ is reached. As illustrated on FIG. 2, when $V_{Batt1}$ drops below $V_{Batt1-SW}$, the first storage device is recharged by using energy from the second storage device and when the energy harvester becomes again operational and supplies power, the energy of the energy harvester is used again to maintain the first storage device charged and to continue charging the second storage device, as discussed above.

By operating the voltage converter system for transferring energy from the second to the first storage device, the voltages of the first and second storage devices can be independent from each other and the first and second storage device can also be made of different technologies. For example, the first rechargeable storage device can be a Li-ion battery operating between 3.6 V and 4.0 V while the second rechargeable storage device can be a supercapacitor chargeable up to a maximum voltage of 2.7 V.

Preferably, the second rechargeable storage device 60 has an energy storage capacity that is more than five times, preferably more than ten times, larger than the energy capacity of the first rechargeable storage device 50. In this way, the second storage device is forming a large energy reservoir that is suitable to maintain the application load operational under conditions where the energy harvester is down for a longer timer period. By taking a first storage device with a smaller energy storage capacity, it will also take less time to charge the first storage device and start operating the application load.

The second parameter $V_{Batt2}$ allows to determine if the second storage device is sufficiently charged for providing output power and this can for example be determined by comparing $V_{Batt2}$ with a predefined threshold value $V_{Batt2-low}$, wherein the second storage device is considered charged if $V_{Batt2} \geq V_{Batt2-low}$.

The second storage device is then considered not sufficiently charged to supply an output power if $V_{Batt2} < V_{Batt2-low}$.

In embodiments, the step of charging the first 50 and the second 60 rechargeable storage device comprises a further sub-step 3a) iii) if the situation occurs wherein $V_{Batt2}$ has reached the upper threshold value $V_{Batt2-max}$. The sub-step 3a) iii) corresponds to performing at least one of the following: a) decoupling the second power output path 32b and/or decoupling the first power input path 31a, b) stop operating the voltage converter system 20, c) coupling the first power input path 31a and coupling the first power output path 32b.

In some embodiments, before performing the step discussed above of coordinating a charging of the first and the second rechargeable storage device by repetitively performing sub-steps 1a) to 4a), an initial step is performed of precharging the second rechargeable storage device 60 up to a predefined charging level. The precharging of the second rechargeable storage device comprises steps of: i) coupling the second power output path 32b between the voltage converter system 20 and the second rechargeable storage device 60 for transferring output power from the voltage converter system to the second rechargeable storage device 60, and ii) operating the voltage converter system 20 for charging the second rechargeable storage device 60 with energy from the energy harvester 70 until the parameter $V_{Batt2}$ has reached a predefined threshold value $V_{Batt2-PC}$, with $V_{Batt2-PC}$ $V_{Batt2-low}$. In this way, it is ensured that when the first rechargeable storage device 50 is charged and the load enabled, there is at least a minimum amount of energy already stored into the second rechargeable storage device 60 in order to guarantee a given autonomy for the application load. For example, if the energy harvester would stop supplying energy shortly after the application load started operating, there is at least sufficient energy available in the second rechargeable storage device that can be transferred to the first rechargeable storage device if $V_{Batt1}$ drops below the critical threshold level $V_{Batt1-SW}$.

In embodiments, the method of the present invention comprises an additional step for the situation where the parameter $V_{Batt1}$ has dropped below the critical threshold value $V_{Batt1-SW}$ and where the second rechargeable storage device 60 is not charged and hence no charges can be transferred from the second to the first rechargeable storage device. In this situation, if the parameter $V_{Batt1}$ has dropped below the critical threshold value $V_{Batt1-SW}$ and if the second rechargeable storage device 60 is not charged, the method comprises a step of decoupling the first power input path and coupling a third power input path between an auxiliary energy source, such as for example a primary battery, and the voltage converter system for transferring input power from the auxiliary energy source to the voltage converter system 20, and operating the voltage converter system 20 for charging the first rechargeable storage device 50 with energy from the primary battery or the alternative power source until the parameter $V_{Batt1}$ of the first storage device 50 has reached the upper threshold value $V_{Batt1-up}$.

Examples of primary batteries are alkaline batteries or zinc-carbon batteries. Advantageously, as the voltage converter is used to transfer the charges from the primary battery to the first rechargeable storage device, the voltage of the primary battery does not need to be the same as the maximum voltage of the first storage device. The primary battery can for example be a AAA cell having a typical voltage level of 1.5 V while the first rechargeable storage device can be a rechargeable Li-Ion battery chargeable up to a typical voltage of 3.7 V.

In embodiments, the voltage converter system 20 comprises one or more voltage converters. A voltage converter is for example a DC-DC buck/boost voltage converter configured for operating in a buck mode if $V_{in} > V_{out}$ and for operating in a boost mode if $V_{in} < V_{out}$, with $V_{in}$ and $V_{out}$ being respectively the input and output voltage of the voltage converter.

In embodiments, the voltage converter system 20 comprises a voltage converter configured for converting input power received via the coupled power input path 31a, 31b, 31c into output power outputted via the coupled power output path 32a, 32b, 32c, and wherein said voltage converter is one of the following: a boost voltage converter, a buck voltage converter or a buck-boost voltage converter. In other words, in these embodiments a single voltage converter is charging the first and second storage device and is also transferring energy from the second to the first storage device under the conditions as discussed above.

According to a second aspect of the invention, an integrated circuit for energy harvesting is provided and an example of a system for energy harvesting 100 comprising such an integrated circuit 1 is shown on FIG. 3. With such a system for energy harvesting, comprising the integrated circuit according to the invention, the method of energy harvesting discussed above comprising steps of charging a first and a second rechargeable storage device and steps of transferring charges from the second to the first rechargeable storage device, can be applied in an automated and controlled way.

The integrated circuit for energy harvesting according to the invention has to be construed as a microchip comprising integrated circuits and a number of input and output pins, also named terminals. The microchip can have for example between 16 and 32 terminals. Generally, the microchip has a compact packaging resulting in a square or rectangular footprint with sides having a length between 1 and 5 mm.

As illustrated on FIG. 3, the integrated circuit 1 for energy harvesting comprises a first terminal 11 connectable with an energy harvester 70, a second terminal 12 connectable with a first rechargeable storage device 50 and a third terminal 13 connectable with a second rechargeable storage device 60. The integrated circuit further comprises a voltage converter system 20 suitable for converting input power into output power for charging at least two storage devices, a controller 40 for controlling the voltage converter system 20 and a monitoring unit 45 coupled with the controller 40 and configured for monitoring a parameter $V_{Batt1}$ and a parameter $V_{Batt2}$. The parameters $V_{Batt1}$ and $V_{Batt2}$ are indicative of a charging level of respectively the first rechargeable storage device and the second rechargeable storage device when connected to respectively the second 12 and the third terminal 13.

In embodiments, the parameter $V_{Batt1}$ and the parameter $V_{Batt2}$ correspond to a voltage sensed at respectively the second 12 and the third 13 terminal. In other embodiments, the parameters $V_{Batt1}$ and $V_{Batt2}$ correspond to an amount of charge counted by a charge counter during the charging process of respectively the first and second rechargeable storage devices.

As shown on FIG. 3, the integrated circuit 1 comprises a plurality of power input paths 31a, 31b for transferring input power from an energy source to the voltage converter system and a plurality of power output paths 32a, 32b for transferring output power from the voltage converter system to the output terminals of the integrated circuit. These input and output power paths have to be construed as electrical conductors. However, the voltage converter system, when in operation, only uses one power path to receive input power and one output path to output the power. Therefore, the voltage converter system 20 comprises an input selection circuit 31 for selecting one power input path from the plurality of power input paths so as to receive an input power via the power input path selected. The voltage converter further comprises an output selection circuit 32 for selecting one power output path from the plurality of power output paths so as to output an output power via the output path selected.

The integrated circuit 1 comprises at least a first power input path 31a configured for transferring input power from the first terminal 11 to the voltage converter system 20, and a second power input path 31b for transferring input power from the third terminal 13 to the voltage converter system 20. The integrated circuit further comprises at least a first power output path 32a for transferring output power from the voltage converter system 20 to the second terminal 12, and a second power output path 32b for transferring output power from the voltage converter system to the third terminal 13. In this way, when a second storage device is connected to the third terminal and when for example the energy harvester is not operating, the voltage converter system can transfer charges from the second rechargeable storage device to the first rechargeable storage device.

The controller 40 is configured to form and switch between a number of specific combinations of power input and power output paths based on a comparison of the parameter $V_{Batt1}$ with first predefined thresholds values and/or a comparison of the parameter $V_{Batt2}$ with second predefined threshold values. The specific combinations the controller can form are: i) a first combination formed by selecting the first power input path 31a and selecting the first power output path 32a, ii) a second combination formed by selecting the first power input path 31a, and selecting the second power output path 32b and iii) a third combination formed by selecting the second power input path 31*b* and selecting the first power output path 32*a*. As will be further discussed in more detail below, the controller not only can form one of these three specific input/output combinations but can also switch from one specific combination to another specific combination based on the comparison of the parameter $V_{Batt1}$ and/or parameter $V_{Batt2}$ with the predefined threshold values. The first predefined threshold values comprise for example the threshold values $V_{Batt1-SW}$, $V_{Batt1-low}$ and $V_{Batt1-up}$ and the second predefined threshold values comprise for example the threshold values $V_{Batt2-max}$ and $V_{Batt2-low}$ discussed above.

The first and second combination of selected power input/output paths as defined above correspond to a combination wherein the voltage converter system is transferring power from the energy harvester to respectively the first and second storage device. The third combination corresponds to the voltage converter system transferring power from the second to the first storage device. By configuring upper and lower thresholds levels for $V_{Batt1}$, the method of energy harvesting according to the present invention can be implemented by switching between the combinations of input/output paths defined depending on the parameters $V_{Batt1}$ and/or $V_{Batt2}$. Indeed, the method of energy harvesting discussed above comprises these steps of switching between the first and second combination of power input/output paths to keep $V_{Batt1}$ between the threshold values $V_{Batt1-low}$ and $V_{Batt1-up}$ and at the same time charge the second storage device. The method according to the invention discussed above also comprises a step of switching to the third combination of power input/output paths wherein energy is transferred from the second to the first storage device if $V_{Batt1}$ drops below the critical threshold value $V_{Batt1-SW}$. The condition of switching to the third combination of power input/output paths is only performed if the second storage device is charged which is determined, as discussed above, by comparing $V_{Batt2}$ with a threshold value.

The controller is performing the switching between the combinations of selected power/input paths based on the conditions and threshold values of the parameters $V_{Batt1}$ and $V_{Batt2}$ as discussed above. In other words, the controller is configured for switching from the first combination to the second combination if the parameter $V_{Batt1}$ becomes equal or larger than an upper threshold value $V_{Batt1-up}$ and if the parameter $V_{Batt2}$ is lower than an upper threshold value $V_{Batt2-max}$, switching from the second combination to the first combination if the parameter $V_{Batt1}$ has decreased from the upper threshold value $V_{Batt1-up}$ down to a lower threshold value $V_{Batt1-low}$, with $V_{Batt1-low} < V_{Batt1-up}$, switching from the first combination to the third combination if the parameter $V_{Batt1}$ has decreased from the lower threshold value $V_{Batt1-low}$ down to a critical threshold value $V_{Batt1-SW}$, with $V_{Batt1-SW} < V_{Batt1-low}$, and if $V_{Batt2}$ is above a lower threshold value $V_{Batt2-low}$, with $V_{Batt2-low} < V_{Batt2-max}$.

In embodiments, the monitoring unit 45 comprises a signal comparator for comparing the parameters $V_{Batt1}$ and $V_{Batt2}$ with predefined threshold values. As mentioned above, the parameters $V_{Batt1}$ and $V_{Batt2}$ correspond for example to a voltage resulting from a voltage measurement, an amount of charge resulting from a charge counter or a detection of any other quantity that is representative for a charging status of a rechargeable energy storage device. The signal comparator can either be an analogue signal comparator or a digital signal comparator, known in the art. For embodiments wherein a digital signal comparator is used, the generally analogue signals $V_{Batt1}$ and $V_{Batt2}$ are first digitized using an ADC (analog to digital converter). The predefined threshold values can be values locally memorized by the controller, or the predefined threshold values can be generated by a reference voltage generator, or a voltage configurator external to the PMIC can be used and threshold values can be transmitted through a configuration terminal or connector.

The voltage converter system 20 comprises one or more voltage converters and a voltage converter is for example a boost voltage converter, a buck voltage converter or a buck-boost voltage converter. In FIG. 4*a* and FIG. 5 examples of embodiments of a voltage converter system 20 are shown comprising a single voltage converter for converting input power received via the selected power input path into output power outputted via the selected power output path. In FIG. 4*b*, FIG. 6*a* and FIG. 6*b* examples of a voltage converter system 20 comprising two voltage converters are shown and in FIG. 7 and FIG. 8, examples of voltage converter systems comprising three voltage converters are shown. These various embodiments of voltage converter systems 20 will be further discussed in more detail here below.

The use of the term "controller" has to be construed in the broadest sense as being an electronic digital circuit generally comprising combinatory logic. The controller controlling the voltage converter system is configured for controlling for example switches of one or more voltage converters and for controlling the switches of the input and output selection circuit.

An embodiment of a voltage converter system comprising a single voltage converter for converting input power, received via the selected power input path, into output power outputted via the selected power output path, is schematically illustrated on FIG. 4*a*, and FIG. 5. The single voltage converter shown makes use of an inductor 25 which is generally located outside the integrated circuit and which can be coupled to the integrated circuit with for example two dedicated terminals 14, 15 or by any other suitable coupling means. The operation of the voltage converter and the selection of the input and output paths will be further discussed.

In the embodiment shown on FIG. 4*a*, the input selection circuit 31 comprises a first input switch SW1-IN for enabling and disabling a current flow in the first power input path 31*a*, a second input switch SW2-IN for enabling and disabling a current flow in the second power input path 31*b*, a first output switch SW1-OUT for enabling and disabling a current flow in the first power output path 32*a* and a second output switch SW2-OUT for enabling and disabling a current flow in the second power output path 32*b*.

Remark that when a specific input power path is selected it implies by definition that the other remaining input paths are de-selected. Hence selecting "a" power input path from the plurality of power input paths so as to receive an input power via the power input path selected has to be construed as selecting "one" power input path from the plurality of power input paths. This is a consequence of the fact that the voltage converter system can only receive one power source as input channel and hence only select one power input path at a time. The same is true for the power output paths, if a specific output path is selected, it implies by definition that the other remaining output paths are de-selected as only one output path can be selected at a time. Hence, selecting "a" power output path from the plurality of power output paths so as to output an output power via the power output path selected has to be construed as selecting "one" power output path from the plurality of power output paths. On the other hand, it is possible to de-select all power input paths and/or de-select all power output paths, for example to stop a transfer of power.

To charge the first rechargeable storage device 50 with energy from the energy harvester 70, the first input path 31*a* and the first output path 32*a* are to be selected and hence the other input and output paths are to be de-selected and remain de-selected during the charging of the first storage device 50. The second input path 31*b* and the second output path 32*b* are for example de-selected by opening respectively switches SW2-IN and SW2-OUT. These switches are shown on FIG. 4*a*.

To charge the second rechargeable storage device 60 with energy from the energy harvester, the first input path 31*a* and the second output path 32*b* are to be selected and the other input and output paths are to be de-selected and remain de-selected during the charging of the second rechargeable storage device. The second input path 31*b* and the first output path 32*a* are for example de-selected by opening respectively switches SW2-IN and SW1-OUT.

To charge the first rechargeable storage device 50 with energy from the second rechargeable storage device 60, the second input path 31*b* and the first output path 32*a* are to be selected and the other input and output paths are to be de-selected and maintained de-selected during the charge transfer from the second to the first rechargeable storage device. The first input path 31*a* and the second output path 32*b* are for example de-selected by opening respectively switches SW1-IN and SW2-OUT.

In a preferred embodiment, the voltage converter 20 is a DC-DC buck/boost voltage converter as illustrated on FIG. 4*a* that is capable of operating in either a boost mode or a buck mode. When the voltage converter input voltage is smaller than the voltage converter output voltage, the buck/boost voltage converter will operate in a boost mode. On the other hand, the buck/boost voltage converter will operate in a buck mode if the input voltage is higher than the output voltage. For example, when the first input path 31*a* and the first output path 32*a* are selected the input and output voltages for determining the operation mode correspond to respectively the voltage at the first terminal 11 and the voltage at the second terminal 12.

To operate the buck/boost voltage converter shown on FIG. 4*a* in a boost mode for charging the first storage device with energy from the energy harvester, the switch SW1-IN is maintained closed and the switch 27*a* remains open during the charging of the first storage device. The boost mode starts with a magnetic energy charging phase of the inductor 25 wherein the switch 27*b* is closed and the switch SW1-OUT is open, followed by a magnetic energy de-charging phase wherein the switch 27*b* is opened and the switch SW1-OUT is closed. As known in the art, by repetitively controlling the switches 27*b* and SW1-OUT, power is transferred in a boost mode from the first terminal 11, i.e. where the energy harvester is connected, to the second terminal 12, where the first rechargeable storage device is connected.

To operate the buck/boost voltage converter shown on FIG. 4*a* in a buck mode for charging the first storage device, the switch SW1-OUT is maintained closed and the switch 27*b* remains open during the charging of the first storage device. The buck mode starts with a magnetic energy charging phase of the inductor 25 wherein the switch 27*a* is open and the switch SW1-IN is closed, followed by a magnetic energy de-charging phase wherein the switch 27*a* is closed and the switch SW1-IN is opened. As known in the art, by repetitively controlling the switches 27*a* and SW1-IN, power is transferred in a buck mode from the first terminal 11, i.e. where the energy harvester is connected, to the second terminal 12, where the first rechargeable storage device is connected.

When the first storage device 50 is charged, i.e. the parameter value $V_{Batt1\text{-}up}$ is reached, the second storage device 60 connected to the third terminal 13 of the integrated circuit can start to be charged with energy from the energy harvester. Therefore, the first output path 32*a* is de-selected by opening switch SW1-OUT and by maintaining this switch open during the charging of the second rechargeable storage device.

For charging the second rechargeable storage device with energy from the energy harvester, depending on the input and output voltages of the voltage converter, the voltage converter will also operate in a buck or a boost mode. For operating in a boost mode, the switch SW1-IN is maintained closed and the switch 27*a* remains open. Similarly as discussed above, the boost mode starts with a magnetic energy charging phase of the inductor wherein the switch 27*b* is closed and the switch SW2-OUT is open, followed by a magnetic energy de-charging phase wherein the switch 27*b* is opened and the switch SW2-OUT is closed. This cycle of magnetically charging and de-charging the inductor is cyclically repeated.

To charge the second rechargeable storage device in a buck mode with energy from the energy harvester, the switch SW2-OUT is maintained closed and the switch 27*b* remains open. The buck mode starts with a charging phase of the inductor 25 wherein the switch 27*a* is open and the switch SW1-IN is closed, followed by a de-charging phase wherein the switch 27*a* is closed and the switch SW1-IN is opened. This cycle of magnetically charging and de-charging the inductor is cyclically repeated.

The various switches shown on FIG. 4*a*, i.e. switches with references 27*a*, 27*b*, SW1-IN, SW2-IN, SW1-OUT and SW2-OUT, have to be construed as electronic switches configured for opening or closing an electrical conducting path or conductor. These switches are for example analogue electronic switches known in the art. These switches make use of for example MOS transistors. With the exemplary embodiment shown on FIG. 4*a*, the number of electronic switches of the integrated circuit is limited as some of these switches are not only used as the standard switches needed for operating the DC/DC voltage converter but are also forming the switches for the input and output path selection circuit.

As discussed above, the energy converter system 20 is not limited to a specific number of voltage converters. In FIG. 4*b* an example of voltage converter system 20 is shown comprising two buck/boost voltage converters and wherein the voltage converter system comprises a plurality of switches with references 27*a*, 27*b*, 28*a*, 28*b*, SW1-IN, SW2-IN, SW1-OUT and SW2-OUT. The switches 27*a*, 27*b*, SW1-IN, SW1-OUT and SW2-OUT are used for operating a first buck/boost voltage converter for transferring power from the energy harvester to either a first rechargeable storage device at a voltage $V_{Batt1}$ or to a second rechargeable storage device at a voltage $V_{Batt2}$. The switches 28*a*, 28*b*, SW2-IN, SW1-OUT are used for operating a second buck/boost voltage converter for transferring power from a second rechargeable storage device at a voltage $V_{Batt2}$ to a first rechargeable storage device at a voltage $V_{Batt2}$. Remark that the switches SW1-IN, SW2-IN, SW1-OUT and SW2-OUT are not only used for the nominal operation of the buck/boost voltage converters but these switches are also forming part of an input selection circuit 31 and an output selection circuit 32 for selecting an input power path and an output power path as schematically illustrated on FIG. 4b. In this example, each of the buck/boost voltage converters makes use of a dedicated inductor 25, 26.

In some embodiments, in addition to the nominal power switches for operating the one or more voltage converters of the voltage converter system 20, additional dedicated switches are used for forming the input and/or output selection circuit. A number of embodiments, as shown on FIG. 6a to FIG. 8, will be further discussed.

In FIG. 6a an example of an embodiment of a voltage converter system 20 is shown comprising, besides the input 31 an output 32 selection circuits, two voltage converters 21a and 21b. As further illustrated on FIG. 6a, there are in this example two power input paths 31a and 31b and two power output paths 32a and 32b. The first voltage converter 21a is used for converting input power received via the first power input path 31a into output power outputted via the first 32a or via the second 32b power output path, depending on what power output path is selected by the output selection circuit 32. The second voltage converter 21b is used for converting input power received via the second power input path 31b into output power outputted via the first power output path 32a. The two voltage converters can make use of one or two inductors (not shown on FIG. 6a). The two voltage converters 21a, 21b do not necessarily have to be of the same type, for example, the first voltage converter 21a can be a buck-boost voltage converter and the second voltage converter 21b can be a buck voltage converter or a boost voltage converter.

In FIG. 6b, an alternative embodiment is shown that can perform the same functionalities as the embodiment shown on FIG. 6a, but wherein the output selection circuit 32 makes use of three switches SW1-OUT, SW2-OUT and SW3-OUT instead of two output switches.

In FIG. 7, an example of an embodiment of a voltage converter system 20 comprising three voltage converters 21a, 21b, 21c is shown. The first voltage converter 21a is converting input power received via the first power input path 31a into output power outputted via the first power output path 32a. The second voltage converter 21b is converting input power received via the second power input path 31b into output power outputted via the first power output path 32a. Finally, the third voltage converter 21c is converting input power received via the first power input path 31a into output power outputted to the second power output path 32b. The three voltage converters can make use of one, two or three inductors (not shown on FIG. 7).

In FIG. 8, an example is shown where the input selection circuit 31 can select from three power input paths 31a, 31b and 31c. The voltage converter system 20 shown comprises three voltage converters 21a, 21b and 21d. The functionality of the first 21a and second 21b voltage converter in this example is the same as for the example shown on FIG. 6a and discussed above. The third voltage converter 21d is used for converting input power received via the third power input path 31c into output power outputted via the first 32a power output path.

For the integrated circuit for energy harvesting according to the invention, the person skilled in the art can specify other embodiments of voltage converter systems 20 than the ones described above and shown on FIG. 4a to FIG. 8. What the embodiments of voltage converter systems according to the invention have in common is that they comprise an input selection circuit 31 for selecting a power input path from a plurality of power input paths so as to receive an input power via the power input path selected and an output selection circuit 32 for selecting a power output path from the plurality of power output paths so as to output an output power via the power output path selected. Remark that, as discussed above, in some embodiments the switches used to select a power input path or to select a power output path correspond to the power switches of the DC/DC voltage converter used for the nominal operation of the DC/DC voltage converter. In this way, the total number of switches needed for the voltage converter system can be limited.

In an embodiment according to the present invention, the controller 40 is configured for performing a step A) of selecting the first input path 31a and repetitively performing the following sub-steps A1) to A4): A1) selecting the first output path 32a, A2) operating the voltage converter 20 for converting input power received via the first power input path 31a into output power outputted via the first power output path, A3) if $V_{Batt1}$ becomes equal or larger than an upper threshold value $V_{Batt1\text{-}up}$ then de-selecting the first output path 32a, and A4) if $V_{Batt2}$ is lower than an upper threshold value $V_{Batt2\text{-}max}$ then
  i) selecting the second output path 32b,
  ii) operating the voltage converter system 20 for converting input power received via the first power input path 31a into output power outputted via the second power output path 32b, and
  iii) de-selecting the second output path 32b and restart with sub-step A1) if $V_{Batt1}$ has subsequently decreased from the upper threshold value $V_{Batt1\text{-}up}$ down to a lower threshold value $V_{Batt1\text{-}low}$, with $V_{Batt1\text{-}low} < V_{Batt1\text{-}up}$.

In this way, by performing the above outlined step A) and its sub-steps A1) to A4), the controller 40 is maintaining the parameter $V_{Batt1}$ between the threshold values $V_{Batt1\text{-}low}$ and $V_{Batt1\text{-}up}$.

In embodiments, the controller 40 is further configured for performing a step B) if $V_{Batt1}$ has decreased from the lower threshold value $V_{Batt1\text{-}low}$ down to a critical threshold value $V_{Batt1\text{-}SW}$, with $V_{Batt1\text{-}SW} < V_{Batt1\text{-}low}$, and if $V_{Batt2}$ is above a lower threshold value $V_{Batt2\text{-}low}$, with $V_{Batt2\text{-}low} < V_{Batt2}$-max. The step B) is composed of the following sub-steps: B1) selecting the second input path 31b, B2) selecting the first output path 32a, and B3) operating the voltage converter 20 for converting input power received via the second power input path 31b into output power outputted via the first power output path 32a.

In this way, by transferring charges from the second to the first rechargeable storage device, the controller avoids the first rechargeable storage device from being fully de-charged when the energy harvester is not operating. At the same time the application load coupled to the first rechargeable storage device can continue to operate even if the energy harvester has stopped operating.

In an embodiment according to the present invention, the controller is configured, when performing sub-step A4) discussed above, for additionally performing a step iv) if $V_{Batt2}$ has reached the upper threshold value $V_{Batt2}$_max. The additional step iv) comprises performing one of the following steps: i) de-selecting the second power output path 32b and/or de-selecting the first power input path 31a, ii) stop operating the voltage converter system 20, iii) selecting the first input path 31a and selecting the first output path 32a.

In this way, by performing this additional step A4) iv), there are no longer charges being transferred to the second rechargeable storage device connected to the third terminal of the integrated circuit. This avoids the second rechargeable storage device from being overcharged.

In embodiments, when in step A4) iv) the option iii) of selecting the first input path 31a and selecting the first output path 32a, is applied, then the energy harvester is again continuing charging the first rechargeable storage device with energy from the energy harvester. If the threshold $V_{Batt1\text{-}up}$ is not a maximum charging level for the first rechargeable storage device and if a maximum charging level $V_{Batt1\text{-}max}$ exists with $V_{Batt1\text{-}max} > V_{Batt1\text{-}up}$, then in this situation where the second rechargeable storage device is fully charged, the first rechargeable storage device can be continued to be charged to the maximum charging level of $V_{Batt1\text{-}max}$.

In an embodiment, when performing step B mentioned above, the controller is configured to additionally perform a sub-step B4), namely if the voltage $V_{Batt1}$ becomes equal or larger than the upper threshold value $V_{Batt1\text{-}up}$ then performing at least one of the following steps: i) de-selecting the first power output path 32a and/or de-selecting the second power input path 31b, ii) selecting the first input path 31a and selecting the second output path 32b, iii) stop operating the voltage converter 20. In embodiments, when the step ii) is applied, then the energy harvester will, when operational, continue to charge the second rechargeable storage device.

In this way, by performing the additional sub-step B4 there are no longer charges being transferred from the second rechargeable storage device, connected to the third terminal, to the first rechargeable storage device, connected to the second terminal. This avoids the first rechargeable storage device from being overcharged. Following the charging of the first rechargeable storage device up to the upper threshold value $V_{Batt1\text{-}up}$ with charges from the second rechargeable storage device, the value of $V_{Batt1}$ will start decreasing again if the application load is consuming power. If the energy harvester is still not operating or still not sufficiently providing power, even after selecting the first power input path and the first power output path, the parameter $V_{Batt1}$ will continue to drop and drop again below $V_{Batt1\text{-}SW}$. When $V_{Batt1}$ drops below $V_{Batt1\text{-}SW}$ then power will again be transferred from the second to the first rechargeable storage device. On the other hand, if the energy harvester has become operational and provides more power than power consumed by the application load, then when $V_{Batt1}$ has decreased down to $V_{Batt1\text{-}low}$, power is transferred from the energy harvester to the first rechargeable storage device and $V_{Batt1}$ is increasing again until $V_{Batt1}$ has reached the upper threshold $V_{Batt1\text{-}up}$.

In embodiments, the monitoring unit 45 is configured to monitor a parameter $V_H$ that indicates if the energy harvester connected to the first terminal is operational or not. In embodiments, this parameter could be a voltage measured at the first input terminal. Based on this parameter $V_H$, the controller can decide when to re-select the first power input path for receiving power from the energy harvester and charging the first rechargeable storage device with charges from the energy harvester instead of charging the first rechargeable storage device with charges from the second rechargeable storage device.

The integrated circuit 1 for energy harvesting according to the present invention is not limited to the number of power input paths and the number of power output paths. In FIG. 5, an integrated circuit 1 with a voltage converter is shown having an input selection circuit 31 configured to select between three power input paths 31a, 31b and 31c and having an output selection circuit 32 configured to select between three power output paths 32a, 32b and 32c. In this example, the input selection circuit 31 and the output selection circuit 32 have respectively additional switches SW3-IN and SW3-OUT.

In further embodiments, a third power input path 31c is used for transferring input power from a fourth terminal to the voltage converter system 20. The fourth terminal is connectable with an auxiliary energy source, such as for example a primary battery. In these embodiments, if the parameter $V_{Batt1}$ has decreased from the lower threshold value $V_{Batt1\text{-}low}$ down to the critical threshold value $V_{Batt1\text{-}SW}$ and if $V_{Batt2}$ is below the lower threshold value $V_{Batt2\text{-}low}$ then, the controller 40 is configured for performing steps of C1) selecting the third power input path 31c, C2) selecting the first power output path 32a and C3) operating the voltage converter 20 for converting input power received via the third power input path 31c into output power outputted via the first power output path 32a.

In this way, if for example the energy harvester is not operating and if the second rechargeable storage device is not charged, an auxiliary power source coupled to the fourth terminal can be used to charge the first rechargeable storage device.

In a particular embodiment, a third power output path 32c is coupling the voltage converter system with a fifth terminal connectable with for example an auxiliary rechargeable storage device being at a voltage $V_{AUX}$. In this way, when the first and the second rechargeable storage device are fully charged, the third rechargeable storage device can be charged.

The invention claimed is:

1. A method for energy harvesting using a voltage converter system (20) for converting input power into output power and for charging at least a first (50) and a second (60) rechargeable storage device, said method comprises:

coupling a first power input path (31a) between an energy harvester (70) and the voltage converter system (20) for transferring input power from the energy harvester (70) to the voltage converter system, monitoring a parameter $V_{Batt1}$ and a parameter $V_{Batt2}$ indicative of a charging level of respectively said first rechargeable storage device (50) and said second rechargeable storage device (60), coupling the first rechargeable storage device (50) to an application load (90) such that the first rechargeable storage device when charged can supply power to the application load (90), coordinating charging of the first (50) and the second (60) rechargeable storage device by repetitively performing sub-steps of:

1a) coupling a first power output path (32a) between the voltage converter system (20) and the first rechargeable storage device (50) for transferring output power from the voltage converter system to the first rechargeable storage device (50), 2a) operating the voltage converter system (20) for transferring charges from the energy harvester (70) to the first rechargeable storage device (50) so as to charge the first rechargeable storage device (50) with energy from the energy harvester (70), and operating the voltage converter system for charging the first rechargeable storage device until the parameter $V_{Batt1}$ has reached an upper threshold value $V_{Batt1\text{-}up}$, 3a) if $V_{Batt1}$ has reached said upper threshold value $V_{Batt1\text{-}up}$ and if $V_{Batt2}$ is below an upper threshold value $V_{Batt2\text{-}max}$ then i) decoupling the first power output path (32a) and coupling a second power output path (32b) between the voltage converter system (20) and the second rechargeable storage device (60) for transferring output power from the voltage converter system to the second rechargeable storage device (60), and ii) operating the voltage converter system (20) for transferring charges from the energy harvester (70) to the second rechargeable storage device (60) so as to charge the second rechargeable storage device (60) with energy from the energy harvester (70), 4a) if during the charging of the second (60) rechargeable storage device the parameter $V_{Batt1}$ has subsequently decreased from the upper threshold value $V_{Batt1-up}$ down to a lower threshold value $V_{Batt1-low}$, with $V_{Batt1-low} < V_{Batt1-up}$, then decoupling the second power output path (32b) and restart at step 1a), transferring energy from the second rechargeable storage device (60) to the first rechargeable storage device (50) if i) the parameter $V_{Batt1}$ of the first rechargeable storage device (50) has dropped below a critical threshold value $V_{Batt1-SW}$, with $V_{Batt1-SW} < V_{Batt1-low}$, and if ii) the parameter $V_{Batt2}$ is equal or above a predefined threshold value $V_{Batt2-low}$, said transferring energy comprises sub-steps of:

1b) decoupling the first power input path (31a), 2b) coupling a second power input path (31b) between the second rechargeable storage device (60) and the voltage converter system (20) for transferring input power from the second rechargeable storage device (60) to the voltage converter system (20), and 3b) operating the voltage converter system (20) for charging the first rechargeable storage device (50) with energy from the second rechargeable storage device (60) until the parameter $V_{Batt1}$ of the first rechargeable storage device (50) has reached said upper threshold value $V_{Batt1-up}$.

2. The method according to claim 1 wherein said second rechargeable storage device (60) has an energy storage capacity that is more than five times larger than the energy storage capacity of the first rechargeable storage device (50).

3. The method according to claim 1 wherein said coordinating charging the first (50) and the second (60) rechargeable storage device comprises a sub-step of:

3a) iii) if $V_{Batt2}$ has reached the upper threshold value $V_{Batt2-max}$, then performing at least one of the following:
a) decoupling the second power output path (32b) and/or decoupling the first power input path (31a),
b) stop operating the voltage converter system (20), or
c) coupling the first power input path (31a) and coupling the first power output path (32b).

4. The method according to claim 1 wherein said transferring energy from the second rechargeable storage device (60) to the first rechargeable storage device (50) comprise a further sub-step of:

4b) if the parameter $V_{Batt1}$ has reached said upper threshold value $V_{Batt1-up}$ then performing one or a combination of the following steps:
i) decoupling the first power output path (32a) and/or decoupling the second power input path (31b),
ii) coupling the first power input path (31a) and coupling the second power output path (32b), or
iii) stop operating the voltage converter system (20).

5. The method according to claim 1 further comprising if the parameter $V_{Batt1}$ has dropped below said critical threshold value $V_{Batt1-SW}$ and if the second rechargeable storage device (60) is not charged then decoupling the first power input path (31a) and coupling a third power input path (31c) between an auxiliary energy source and the voltage converter system for transferring input power from said auxiliary energy source to the voltage converter system (20), and operating the voltage converter system (20) for charging the first rechargeable storage device (50) with energy from said auxiliary energy source until the parameter $V_{Batt1}$ of the first storage device (50) has reached said upper threshold value $V_{Batt1-up}$.

6. The method according to claim 1 comprising precharging the second rechargeable storage device (60) by performing steps of:

i) coupling the second power output path (32b) between the voltage converter system (20) and the second rechargeable storage device (60) for transferring output power from the voltage converter system to the second rechargeable storage device (60), and ii) operating the voltage converter system (20) for charging the second rechargeable storage device (60) with energy from the energy harvester (70) until the parameter $V_{Batt2}$ has reached a predefined threshold value $V_{Batt2-PC}$, with $V_{Batt2-PC} > V_{Batt2-low}$, and wherein said step of precharging is performed before performing said step of coordinating charging of the first (50) and the second (60) rechargeable storage device.

7. The method according to claim 1 wherein said voltage converter system (20) comprises a voltage converter configured for converting input power received via the coupled power input path (31a, 31b, 31c) into output power outputted via the coupled power output path (32a, 32b, 32c), and wherein said voltage converter is one of the following: a boost voltage converter, a buck voltage converter or a buck-boost voltage converter.

8. An integrated circuit (1) for energy harvesting comprising
a voltage converter system (20) suitable for converting input power into output power and suitable for charging at least two rechargeable storage devices,
a first terminal (11) connectable with an energy harvester (70),
a second terminal (12) connectable with a first rechargeable storage device (50),
a third terminal (13) connectable with a second rechargeable storage device (60),
a controller (40) for controlling said voltage converter system (20),
a plurality of power input paths comprising at least a first power input path (31a) for transferring input power from said first terminal (11) to the voltage converter system (20),
a plurality of power output paths comprising at least a first power output path (32a) for transferring output power from the voltage converter system (20) to said second terminal (12) and a second power output path (32b) for transferring output power from the voltage converter system to said third terminal (13),
a monitoring unit (45) coupled with said controller (40) and configured for monitoring a parameter $V_{Batt1}$ and a parameter $V_{Batt2}$ indicative of a charging level of respectively the first rechargeable storage device (50) and the second rechargeable storage device (60) when connected to respectively said second (12) and third terminal (13),
characterized in that said plurality of power input paths comprises a second power input path (31b) for transferring input power from said third terminal (13) to the voltage converter system (20), and in that the voltage converter system (20) comprises an input selection circuit (31) configured for selecting a power input path from said plurality of power input paths so as to receive an input power via the power input path selected and an output selection circuit (32) configured for selecting a power output path from said plurality of power output paths so as to output an output power via the power output path selected, and in that said controller (40) is configured to form and to switch between a number of specific combinations of a power input and a power output path based on a comparison of the parameter $V_{Batt1}$ with first predefined threshold values and/or a comparison of the parameter $V_{Batt2}$ with second predefined threshold values, and wherein said specific combinations comprise:
  i) a first combination formed by selecting said first power input path (31a) and selecting said first power output path (32a),
  ii) a second combination formed by selecting said first power input path (31a) and selecting said second power output path (32b), and
  iii) a third combination formed by selecting said second power input path (31b) and selecting said first power output path (32a).

9. The integrated circuit (1) according to claim 8 wherein said controller (40) is configured for performing:
  selecting said first power input path (31a) and repetitively performing sub-steps of
  A1) selecting said first power output path (32a),
  A2) operating the voltage converter system (20) for converting input power received via the first power input path (31a) into output power outputted via the first power output path (32a),
  A3) if $V_{Batt1}$ becomes equal or larger than an upper threshold value $V_{Batt1-up}$ then de-selecting said first power output path (32a),
  A4) if $V_{Batt2}$ is lower than an upper threshold value $V_{Batt2-max}$ then
    i) selecting said second power output path (32b),
    ii) operating the voltage converter system (20) for converting input power received via the first power input path (31a) into output power outputted via the second power output path (32b), and
    iii) if $V_{Batt1}$ has subsequently decreased from the upper threshold value $V_{Batt1}$-up down to a lower threshold value $V_{Batt1-low}$, with $V_{Batt1-low}<V_{Batt1-up}$, then de-selecting said second power output path (32b) and restart with sub-step A1),
  if $V_{Batt1}$ has decreased from said lower threshold value VBatt1-low down to a critical threshold value $V_{Batt1-SW}$, with $V_{Batt1-SW}<V_{Batt1-low}$, and if $V_{Batt2}$ is above a lower threshold value $V_{Batt2-low}$, with $V_{Batt2-low}<V_{Batt2-max}$, then performing sub-steps of
  B1) selecting said second power input path (31b),
  B2) selecting said first power output path (32a), and
  B3) operating the voltage converter system (20) for converting input power received via the second power input path (31b) into output power outputted via the first power output path (32a).

10. The integrated circuit (1) according to claim 9 wherein said sub-step A4) further comprises
  A4) iv) if $V_{Batt2}$ has reached said upper threshold value $V_{Batt2-max}$ then performing at least one of the following steps:
    i) de-selecting said second power output path (32b) and/or de-selecting said first power input path (31a),
    ii) stop operating said voltage converter system (20), and
    iii) selecting the first input path (31a) and selecting the first output path (32a).

11. The integrated circuit (1) according to claim 9 wherein said controller is configured for performing a further sub-step:
  B4) if said voltage $V_{Batt1}$ becomes equal or larger than said upper threshold value $V_{Batt1-up}$ then performing at least one of the following:
    i) de-selecting said first power output path (32a) and/or de-selecting said second power input path (31b),
    ii) selecting the first power input path (31a) and selecting the second power output path (32b), or
    iii) stop operating said voltage converter system (20).

12. The integrated circuit (1) according to claim 8 wherein said controller (40) is further configured for:
  switching from said first combination to said second combination if the parameter $V_{Batt1}$ becomes equal or larger than an upper threshold value $V_{Batt1-up}$ and if the parameter $V_{Batt2}$ is lower than an upper threshold value $V_{Batt2-max}$,
  switching from said second combination to said first combination if the parameter $V_{Batt1}$ has decreased from the upper threshold value $V_{Batt1-up}$ down to a lower threshold value $V_{Batt1-low}$, with $V_{Batt1-low}<V_{Batt1-up}$, and
  switching from said first combination to said third combination if the parameter $V_{Batt1}$ has decreased from said lower threshold value $V_{Batt1-low}$ down to a critical threshold value $V_{Batt1-SW}$, with $V_{Batt1-SW}<V_{Batt1-low}$, and if $V_{Batt2}$ is above a lower threshold value $V_{Batt2-low}$, with $V_{Batt2-low}<V_{Batt2-max}$.

13. The integrated circuit (1) according to claim 8 wherein said input selection circuit (31) comprises a first input switch (SW1-IN) for enabling and disabling a current flow in said first power input path (31a), a second input switch (SW2-IN) for enabling and disabling a current flow in said second power input path (31b), a first output switch (SW1-OUT) for enabling and disabling a current flow in said first power output path (32a) and a second output switch (SW2-OUT) for enabling and disabling a current flow in said second power output path (32b).

14. The integrated circuit (1) according to claim 8 comprising a fourth terminal connectable with an auxiliary energy source and wherein said plurality of power input paths comprises a third input path (31c) for transferring input power from said fourth terminal to the voltage converter system, and wherein said specific combinations comprise:
  iv) a fourth combination formed by selecting said third power input path (31c) and selecting said first power output path (32a).

15. The integrated circuit (1) according to claim 8 wherein said voltage converter system (20) comprises a voltage converter for converting input power received via the selected power input path (31a, 31b, 31c) into output power outputted via the selected power output path (32a, 32b, 32c), and wherein said voltage converter is one of the following: a boost voltage converter, a buck voltage converter or a buck-boost voltage converter.

16. The integrated circuit (1) according to claim 8 wherein said voltage converter system (20) comprises
  a first voltage converter (21a) for converting input power received via the first power input path (31a) into output power outputted via the first (32a) or via the second (32b) power output path, a second voltage converter (21b) for converting input power received via the second power input path (31b) into output power outputted via the first power output path (32a).

17. The integrated circuit (1) according to claim 8 wherein said voltage converter system (20) comprises
a first voltage converter (21a) for converting input power received via the first power input path (31a) into output power outputted via the first power output path (32a),
a second voltage converter (21b) for converting input power received via the second power input path (31b) into output power outputted via the first power output path (32a), and
a third voltage converter (21c) for converting input power received via the first power input path (31a) into output power outputted via the second power output path (32b).

18. A system for energy harvesting comprising
an integrated circuit (1) according to claim 8,
an energy harvester (70) coupled to said first terminal (11),
a first rechargeable storage device (50) coupled to said second terminal (12), and
a second rechargeable storage device (60) coupled to said third terminal (13), and wherein said second rechargeable storage device (60) has an energy storage capacity that is more than five times larger than the energy storage capacity of the first rechargeable storage device (50).

19. The method according to claim 1 wherein said second rechargeable storage device (60) has an energy storage capacity that is more than ten times larger than the energy storage capacity of the first rechargeable storage device (50).

20. The system according to claim 18 wherein at least one of said first rechargeable storage device and said second rechargeable storage device is a rechargeable battery, a capacitor or supercapacitor.

* * * * *